US012811835B2

(12) United States Patent
Lee et al.

(10) Patent No.: US 12,811,835 B2
(45) Date of Patent: Nov. 24, 2026

(54) EXTENDED RANGE PHYSICAL LAYER PROTOCOL DATA UNIT (PPDU)

(71) Applicant: Apple Inc., Cupertino, CA (US)

(72) Inventors: Wook Bong Lee, San Jose, CA (US); Anuj Batra, Redwood City, CA (US); Chuxiang Li, Fremont, CA (US); Morteza Mehrnoush, Hayward, CA (US); Oren Shani, Saratoga, CA (US); Shi Cheng, Cupertino, CA (US); Yanjun Sun, San Diego, CA (US); Yong Liu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 320 days.

(21) Appl. No.: 18/758,240

(22) Filed: Jun. 28, 2024

(65) Prior Publication Data

US 2025/0016036 A1 Jan. 9, 2025

Related U.S. Application Data

(60) Provisional application No. 63/547,477, filed on Nov. 6, 2023, provisional application No. 63/525,636, filed on Jul. 7, 2023.

(51) Int. Cl.
*H04W 4/00* (2018.01)
*H04L 27/26* (2006.01)
*H04W 84/12* (2009.01)

(52) U.S. Cl.
CPC ...... *H04L 27/2605* (2013.01); *H04L 27/2637* (2013.01); *H04W 84/12* (2013.01)

(58) Field of Classification Search
CPC ............. H04L 27/2605; H04L 27/2637; H04L 5/0007; H04L 5/0048; H04L 25/03343; H04L 27/2657; H04L 27/26132; H04L 27/2603; H04L 27/2602; H04W 84/12
See application file for complete search history.

(56) References Cited

U.S. PATENT DOCUMENTS

| | | | | |
|---|---|---|---|---|
| 2018/0014329 | A1* | 1/2018 | Lee | H04L 27/2602 |
| 2018/0199272 | A1* | 7/2018 | Chu | H04L 1/0083 |
| 2018/0316467 | A1* | 11/2018 | Zhu | H04L 5/0044 |
| 2019/0013978 | A1* | 1/2019 | Zhou | H04L 1/0006 |
| 2019/0116513 | A1* | 4/2019 | Verma | H04W 74/002 |
| 2020/0228634 | A1* | 7/2020 | Noh | H04L 5/0048 |
| 2020/0413482 | A1* | 12/2020 | Takada | H04L 1/0006 |
| 2021/0289500 | A1* | 9/2021 | Yang | H04L 5/0044 |
| 2021/0297297 | A1* | 9/2021 | Lim | H04L 27/22 |
| 2021/0345339 | A1* | 11/2021 | Hedayat | H04W 72/0446 |

(Continued)

FOREIGN PATENT DOCUMENTS

WO WO2024210977 A1 10/2024

*Primary Examiner* — Thai Dinh Hoang

(74) *Attorney, Agent, or Firm* — Fish & Richardson P.C.

(57) ABSTRACT

Disclosed are methods, systems, and computer-readable medium to perform operations including generating an extended range physical layer protocol data unit (ER-PPDU) for transmission to a receiver, the ER-PPDU including an ultra-high reliability extended range long training field (UHR-ER LTF) and an ultra-high reliability extended range signal field (UHR-ER SIG), and transmitting the ER-PPDU to the receiver, in which at least one of the UHR-ER-LTF or the UHR-ER-SIG is repeated two or more times in the time domain or the frequency domain.

20 Claims, 26 Drawing Sheets

(56) References Cited

U.S. PATENT DOCUMENTS

| | | | | |
|---|---|---|---|---|
| 2021/0352663 | A1* | 11/2021 | Hedayat | H04W 72/0446 |
| 2021/0391961 | A1* | 12/2021 | Cao | H04L 1/04 |
| 2022/0116921 | A1* | 4/2022 | Lim | H04L 1/08 |
| 2022/0150015 | A1* | 5/2022 | Liu | H04L 1/08 |
| 2022/0407644 | A1* | 12/2022 | Cao | H04B 1/69 |
| 2023/0148403 | A1 | 5/2023 | Fang et al. | |
| 2023/0363000 | A1* | 11/2023 | Yang | H04W 74/0816 |
| 2024/0015059 | A1* | 1/2024 | Balakrishnan | H04L 27/2085 |
| 2024/0048304 | A1* | 2/2024 | Lanante | H04L 27/26025 |
| 2024/0146589 | A1* | 5/2024 | Lim | H04L 1/08 |
| 2024/0146597 | A1* | 5/2024 | Noh | H04L 5/0051 |
| 2024/0172278 | A1* | 5/2024 | Chen | H04W 74/0808 |
| 2025/0071006 | A1* | 2/2025 | Yu | H04L 1/08 |
| 2026/0005807 | A1* | 1/2026 | Li | H04L 1/08 |

* cited by examiner

EXTENDED RANGE PHYSICAL LAYER PROTOCOL DATA UNIT (PPDU)

CROSS-REFERENCE TO RELATED APPLICATIONS

The present application claims priority to and the benefit of U.S. Provisional Patent Application No. 63/525,636, filed on Jul. 7, 2023, and U.S. Provisional Patent Application No. 63/547,477, filed on Nov. 6, 2023, each of which is herein incorporated by reference in its entirety.

BACKGROUND

Many electronic devices communicate with each other using wireless local area networks (WLANs), such as those based on a communication protocol that is compatible with an Institute of Electrical and Electronics Engineers (IEEE) standard, e.g., the IEEE 802.11 standard (also known as "Wi-Fi"). A WLAN typically includes an access point that provides one or more stations (STAs) with access to another network, such as the Internet. There are many generations of the IEEE 802.11 standard, including 802.11ax (Wi-Fi 6) and 802.11be (Wi-Fi 7).

IEEE 802.11 is a packet-based protocol. Under this protocol, a transmitter, e.g., an access point (AP), packages control information or user data into a protocol data unit (PDU) in a physical layer convergence protocol (PLCP). The PLCP PDU (PPDU) includes a preamble and a data field, among other fields. After generating the PPDU, the access point can send the PPDU to a station connected to the access point. Communication from the access point to a station is referred to as the downlink, and the communication from a station to the access point is referred to as the uplink.

SUMMARY

The present disclosure describes techniques for improving the uplink link budget and the reliability of uplink transmissions in Wi-Fi and other wireless communication networks.

In general, in a first aspect, a method includes: generating an extended range physical layer protocol data unit (ER-PPDU) for transmission to a receiver, the ER-PPDU including an ultra-high reliability extended range long training field (UHR-ER-LTF) and an ultra-high reliability extended range signal field (UHR-ER-SIG), and transmitting the ER-PPDU to the receiver, in which at least one of the UHR-ER-LTF or the UHR-ER-SIG is repeated two or more times in the time domain or the frequency domain.

In a second aspect combinable with the first aspect, the ER-PPDU further includes a legacy short training field (L-STF), a legacy long training field (L-LTF), and one or more additional fields between the L-LTF and the UHR-ER-LTF, the one or more additional fields including at least one of a legacy signal field (L-SIG), a repeated legacy signal field (RL-SIG), a universal signal field (U-SIG), or an ultra-high reliability short training field (UHR-STF).

In a third aspect combinable with the first or second aspects, at least one of the L-STF or the L-LTF are power boosted by 3 or more decibels.

In a fourth aspect combinable with any of the first through third aspects, the at least one of the UHR-ER-LTF or the UHR-ER-SIG is modulated over an entire length of an orthogonal frequency division multiplexing (OFDM) symbol.

In a fifth aspect combinable with any of the first through fourth aspects, the at least one of the UHR-ER-LTF or the UHR-ER-SIG is modulated over the entire length of the OFDM symbol using every fourth subcarrier of the OFDM symbol.

In a sixth aspect combinable with any of the first through fifth aspects, the OFDM symbol length including guard interval is 16 microseconds.

In a seventh aspect combinable with any of the first through sixth aspects, the ER-PPDU includes 52-tone resource units and a channel bandwidth of 20 megahertz, and the at least one of the UHR-ER-LTF or the UHR-ER-SIG is modulated over the entire length of the OFDM symbol using every fourth subcarrier from subcarrier index −104 to subcarrier index 104.

In an eighth aspect combinable with any of the first through seventh aspects, the at least one of the UHR-ER-LTF or the UHR-ER-SIG is repeated four times in the time domain or the frequency domain.

In a ninth aspect combinable with any of the first through eighth aspects, operations of the method include obtaining data for transmission to the receiver, in which the ER-PPDU further includes a data field including at least a portion of the data for transmission to the receiver.

In a tenth aspect combinable with any of the first through ninth aspects, the data field is repeated two or more times in the time domain or the frequency domain.

In an eleventh aspect combinable with any of the first through tenth aspects, the data field modulated over an entire length of an OFDM symbol using every fourth subcarrier of the OFDM symbol.

In a twelfth aspect combinable with any of the first through eleventh aspects, operations of the method include performing center frequency offset (CFO) correction before transmission of the ER-PPDU to the receiver, in which a residual CFO after performing the CFO correction is less than or equal to 15 kilohertz.

In a thirteenth aspect combinable with any of the first through twelfth aspects, the operations of the method are performed by a non-access point station (non-AP STA).

In a fourteenth aspect combinable with any of the first through thirteenth aspects, operations of the method include receiving an indication from the receiver of a maximum size for the ER-PPDU, and generating the ER-PPDU in accordance with the maximum size.

In general, in a fifteenth aspect, a method includes: receiving, from a transmitter, an extended range physical layer protocol data unit (ER-PPDU), the ER-PPDU including an ultra-high reliability extended range long training field (UHR-ER-LTF) and an ultra-high reliability extended range signal field (UHR-ER-SIG), in which at least one of the UHR-ER-LTF or the UHR-ER-SIG is repeated two or more times in the time domain or frequency domain, and processing the ER-PPDU to obtain information included in at least one of the UHR-ER-LTF or the UHR-ER-SIG.

In a sixteenth aspect combinable with the fifteenth aspect, the ER-PPDU further includes a legacy short training field (L-STF), a legacy long training field (L-LTF), and one or more additional fields between the L-LTF and the UHR-ER-LTF, the one or more additional fields including at least one of a legacy signal field (L-SIG), a repeated legacy signal field (RL-SIG), a universal signal field (U-SIG), or an ultra-high reliability short training field (UHR-STF), the operations of the method further including: processing the PPDU to obtain information included in at least one of the L-STF, the L-LTF, or the one or more additional fields.

In a seventeenth aspect combinable with the fifteenth or sixteenth aspects, at least one of the L-STF and the L-LTF are power boosted by 3 or more decibels.

In an eighteenth aspect combinable with any of the fifteenth through seventeenth aspects, the at least one of the UHR-ER-LTF or the UHR-ER-SIG is modulated over the entire length of an orthogonal frequency division multiplexing (OFDM) symbol using every fourth subcarrier of the OFDM symbol.

In a nineteenth aspect combinable with any of the fifteenth through eighteenth aspects, the ER-PPDU includes 52-tone resource units and a channel bandwidth of 20 megahertz, and the at least one of the UHR-ER-LTF or the UHR-ER-SIG is modulated over the entire length of the OFDM symbol using every fourth subcarrier from subcarrier index −104 to subcarrier index 104.

In a twentieth aspect combinable with any of the fifteenth through nineteenth aspects, the at least one of the UHR-ER-LTF or the UHR-ER-SIG is repeated four times in the time domain or the frequency domain.

In a twenty-first aspect combinable with any of the fifteenth through twentieth aspects, the ER-PPDU includes a data field that is repeated two or more times in the time domain or the frequency domain, the operations of the method further include processing the ER-PPDU to obtain information included in the data field.

In a twenty-second aspect combinable with any of the fifteenth through twenty-first aspects, operations of the method include performing cross correlation to detect a center frequency offset (CFO) for the ER-PPDU.

In a twenty-third aspect combinable with any of the fifteenth through twenty-second aspects, a center frequency offset (CFO) for the ER-PPDU is corrected before transmission such that a residual CFO for the ER-PPDU is less than or equal to 15 kilohertz.

In a twenty-fourth aspect combinable with any of the fifteenth through twenty-third aspects, the operations of the method are performed by an access point station (AP STA), and the transmitter is a non-access point station (non-AP STA).

In general, in a twenty-fifth aspect, a method includes transmitting a request to trigger to a receiver, the request to trigger indicating a size of data to be transmitted to the receiver; receiving a trigger from a receiver, the trigger indicating a duration for transmission of the data to the receiver, in which the duration is determined based on the size of the data indicated in the request to trigger; and based in part on the duration, generating a trigger-based physical layer protocol data unit (TB-PPDU) including the data to be transmitted to the receiver.

In a twenty-sixth aspect combinable with the twenty-fifth aspect, operations of the method include receiving, from the receiver, an acknowledgement of the request to trigger, in which the acknowledgement is received before receipt of the trigger.

In a twenty-seventh aspect combinable with the twenty-fifth or twenty-sixth aspects, operations of the method include transmitting the TB-PPDU to the receiver.

In a twenty-eighth aspect combinable with any of the twenty-fifth through twenty-seventh aspects, the TB-PPDU includes an ultra-high reliability TB-PPDU.

In a twenty-ninth aspect combinable with any of the twenty-fifth through twenty-eighth aspects, the request to trigger includes an indication of one or more of a medium access control (MAC) address, a station identifier, a queue size, access category information, or a packet type of the data to be transmitted.

In a thirtieth aspect combinable with any of the twenty-fifth through twenty-ninth aspects, the request to trigger is transmitted in response to the size of the data satisfying a threshold value.

In a thirty-first aspect combinable with any of the twenty-fifth through thirtieth aspects, the operations of the method are performed by a non-access point station (non-AP STA).

In general, in a thirty-second aspect, a method includes: receiving a request to trigger from a transmitter, the request to trigger indicating a size of data to be transmitted by the transmitter; determining, based on the size of the data, a duration for a trigger-based physical protocol data unit (TB-PPDU); and transmitting a trigger to the transmitter, the trigger indicating the duration of the TB-PPDU.

In a thirty-second aspect combinable with the thirty-first aspect, operations of the method include transmitting, to the transmitter, an acknowledgement of the request to trigger, in which the acknowledgement is transmitted before transmission of the trigger.

In a thirty-third aspect combinable with the thirty-first or thirty-second aspects, operations of the method include receiving the TB-PPDU including the data, the TB-PPDU having been generated based on the duration.

In a thirty-fourth aspect combinable with any of the thirty-first through thirty-third aspects, the TB-PPDU is an ultra-high reliability TB-PPDU.

In a thirty-fifth aspect combinable with any of the thirty-first through thirty-fourth aspects, operations of the method are performed by an access point (AP), and the transmitter is a non-access point station (non-AP STA).

In general, in a thirty-sixth aspect, a method includes receiving a non-high throughput physical protocol data unit (non-HT PPDU), and transmitting a control frame in response to the non-HT PPDU, the control frame including an ultra-high reliability extended range single user PPDU (UHR ER SU PPDU) format.

In a thirty-seventh aspect combinable with the thirty-sixth aspect, the non-HT PPDU includes a request to send (RTS), and the control frame including the UHR ER SU PPDU format includes a clear to send (CTS).

In a thirty-eighth aspect combinable with the thirty-sixth or thirty-seventh aspects, the control frame including the UHR ER SU PPDU format is transmitted in duplicate transmission mode over a bandwidth greater than or equal to 20 megahertz.

In a thirty-ninth aspect combinable with any of the thirty-sixth through thirty-eighth aspects, the control frame is transmitted using the UHR ER SU PPDU format according to a mode of operation.

In a fortieth aspect combinable with any of the thirty-sixth through thirty-ninth aspects, the mode of operation is negotiated based on an operation mode notification, a capability field, or a control response.

In a forty-first aspect combinable with any of the thirty-sixth through fortieth aspects, the mode of operation is set according to an indication in a quality of service null (QoS-Null) frame.

In a forty-second aspect combinable with any of the thirty-sixth through forty-first aspects, the mode of operation remains unchanged until a counterindication in the QoS-Null frame.

In a forty-third aspect combinable with any of the thirty-sixth through forty-second aspects, operations of the method are performed by a non-access point station (non-AP STA).

In general, in a forty-fourth aspect, a method includes: transmitting a non-high throughput physical protocol data unit (non-HT PPDU), and receiving a control frame in response to the non-HT PPDU, the control frame including an ultra-high reliability extended range single user PPDU (UHR ER SU PPDU) format.

In a forty-fifth aspect combinable with the forty-fourth aspect, the non-HT PPDU includes a request to send (RTS), and the control frame including the UHR ER SU PPDU format includes a clear to send (CTS).

In a forty-sixth aspect combinable with the forty-fourth or forty-fifth aspects, the control frame including the UHR ER SU PPDU format is received in duplicate transmission mode over a bandwidth greater than or equal to 20 megahertz.

In a forty-seventh aspect combinable with any of the forty-fourth through forty-sixth aspects, the control frame is received using the UHR ER SU PPDU format according to a mode of operation.

In a forty-eighth aspect combinable with any of the forty-fourth through forty-seventh aspects, the mode of operation is negotiated based on an operation mode notification, a capability field, or a control response.

In a forty-ninth aspect combinable with any of the forty-fourth through forty-eighth aspects, the mode of operation is set according to an indication in a quality of service null (QoS-Null) frame.

In a fiftieth aspect combinable with any of the forty-fourth through forty-ninth aspects, the mode of operation remains unchanged until a counterindication in the QoS-Null frame.

In a fifty-first aspect combinable with any of the forty-fourth through fiftieth aspects, the method is performed by an access point (AP).

In general, in an fifty-second aspect, a device includes one or more processors and one or more storage devices storing instructions executable by the one or more processors to cause the one or more processors to perform the operations of any of the preceding aspects.

In general, in an fifty-third aspect, a non-transitory computer storage medium stores instructions executable by one or more processors to cause the one or more processors to perform the operations of any of the first through fifty-first aspects.

In general, in a fifty-fourth aspect, at least one processor is configured to perform the operations of any of the first through fifty-first aspects In general, in a fifty-fifth aspect, a system includes one or more processors and one or more storage devices storing instructions executable by the one or more processors to cause the one or more processors to perform the operations of any of the first through fifty-first aspects The details of one or more embodiments of these systems and methods are set forth in the accompanying drawings and the description below. Other features, objects, and advantages of these systems and methods will be apparent from the description and drawings, and from the claims.

DETAILED DESCRIPTION

In Wi-Fi networks, the transmit power of a non-access point station (non-AP STA) is approximately 10 decibels (dB) less than that of an access point station (AP STA). One reason for this difference is government regulations that impose different transmit power restrictions for AP and non-AP STAs. For instance, the United States' Federal Communication Commission (FCC) limits the transmit power of non-AP STAs operating in the 5.15-5.25 GHz range to 24 dBm and 11 dBm per MHz, whereas AP STAs operating in the same range are allowed to transmit with a power of up to 30 dBm and 17 dBm per MHz. Another reason is implementation differences among AP and non-AP STAs, such as an AP STA generally having a better power amplifier than that of a non-AP STA. Due to this transmit power disparity, transmissions from a non-AP STA to an AP STA (also referred to herein as "uplink transmissions") can have a lower signal-to-noise ratio (SNR) relative to transmissions from an AP STA to a non-AP STA (also referred to herein as "downlink transmissions"). As a result, the uplink link budget and the reliability of uplink transmissions in a Wi-Fi network can be significantly lower than downlink transmissions, especially over extended ranges.

The present disclosure describes techniques for improving the uplink link budget and the reliability of uplink transmissions in Wi-Fi and other wireless communication networks. In accordance with an aspect of the present disclosure, an ultra-high reliability extended range physical layer protocol data unit (UHR ER PPDU) is described. In some examples, the UHR ER PPDU includes an ultra-high reliability extended range long training field (UHR-ER-LTF) and an ultra-high reliability extended range signal field (UHR-ER-SIG) that are modulated over an entire orthogonal frequency division multiplexing (OFDM) symbol length to boost the effective receive power and SNR of uplink transmissions. In some examples, the described UHR ER PPDU includes an extended range preamble to enable STAs to more efficiently decode the PPDU. The present disclosure also provides techniques for center frequency offset (CFO) correction using cross correlation to improve packet detection and overcome the 10 dB transmit power difference. Also described are improved trigger request procedures, and extensions to enable greater control over control response frame formats. Note that although the present disclosure is described in the context of improving the uplink communications, the techniques described herein can also be used to improve other communications, such as downlink communications or point to point communications where one device has lower capabilities or power than the other.

Figure 1:
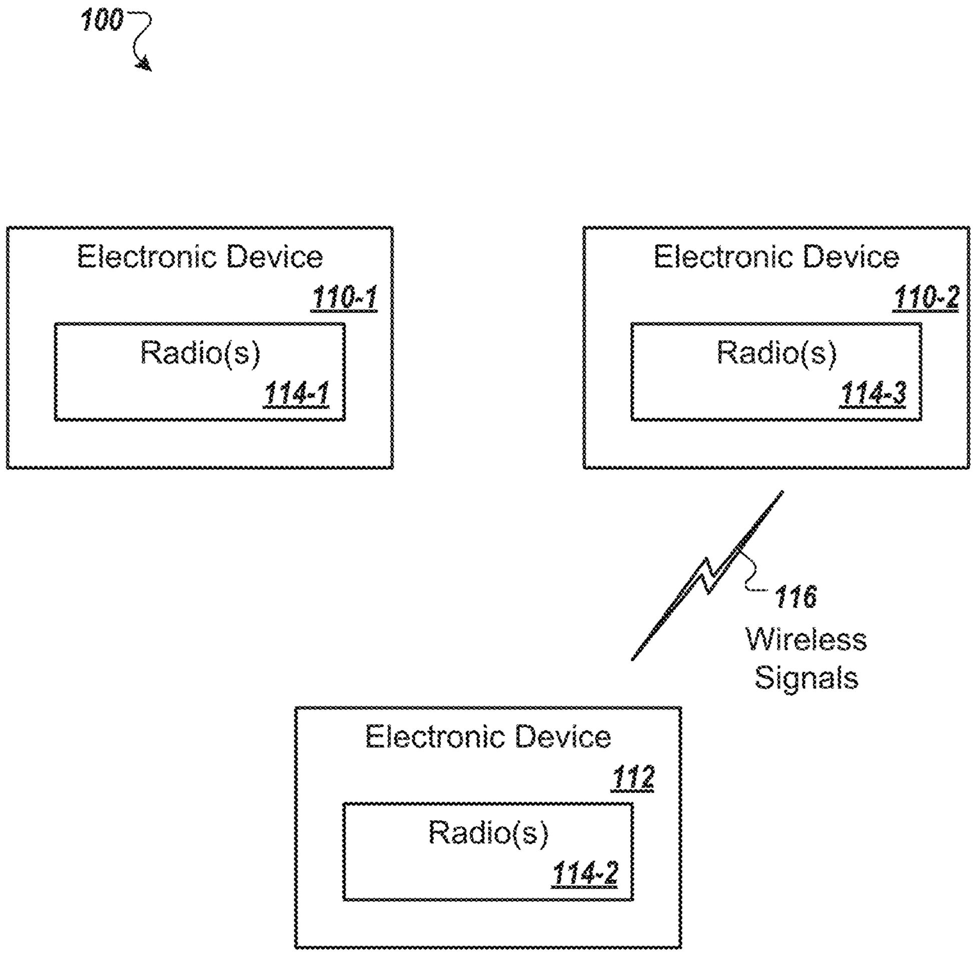
FIG. 1 illustrates a block diagram of example of electronic devices communicating wirelessly, according to some implementations.

Referring to FIG. 1, a block diagram 100 of example of electronic devices communicating wirelessly is shown, according to some implementations. Notably, one or more electronic devices 110 (such as a smartphone, a laptop computer, a notebook computer, a tablet, or another such electronic device) and access point 112 can communicate wirelessly in a WLAN using an IEEE 802.11 communication protocol. Thus, electronic devices 110 can be associated with or can have a connection with access point 112. For example, electronic devices 110 and access point 112 can wirelessly communicate while: detecting one another by scanning wireless channels, transmitting and receiving beacons or beacon frames on wireless channels, establishing connections (e.g., by transmitting connect requests), and/or transmitting and receiving packets or frames (which can include the request and/or additional information, such as data, as payloads). Note that the access point 112 can provide access to a network, such as the Internet, via an Ethernet protocol, and can be a physical access point or a virtual or "software" access point that is implemented on a computer or an electronic device. In this specification, electronic devices 110 are sometimes referred to as "recipient electronic devices," "receiver stations," or "non-AP STAs," and access point 112 is sometimes referred to as an "AP STA."

Although the environment shown in FIG. 1 is provided as an example, in alternative implementations, different numbers and/or types of electronic devices can be present. For example, some implementations can include more or fewer electronic devices. As another example, in some implementations, different electronic devices can be transmitting and/or receiving packets or frames. In some implementations, multiple links can be used during communication between electronic devices 110.

As described further below with reference to FIG. 12, electronic devices 110 and access point 112 can include subsystems, such as a networking subsystem, a memory subsystem, and a processor subsystem. In addition, electronic devices 110 and access point 112 can include radios 114 in the networking subsystems. More generally, electronic devices 110 and access point 112 can include (or can be included within) any electronic devices with networking subsystems that enable electronic devices 110 and access point 112, respectively, to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options, transmit and receive packets or frames via the connection, etc.

As shown in FIG. 1, wireless signals 116 are communicated by one or more radios 114-1 and 114-2 in electronic device 110-1 and access point 112, respectively. For example, as noted previously, electronic device 110-1 and access point 112 can exchange packets or frames using a Wi-Fi communication protocol in a WLAN. Further, one or more radios 114-1 can receive wireless signals 116 that are transmitted by one or more radios 114-2 via one or more links between electronic device 110-1 and access point 112. Alternatively, the one or more radios 114-1 can transmit wireless signals 116 that are received by the one or more radios 114-2.

In some implementations, wireless signals 116 are communicated by one or more radios 114 in electronic devices 110 and access point 112, respectively. For example, one or more radios 114-1 and 114-3 can receive wireless signals 116 that are transmitted by one or more radios 114-2 via one or more links between the electronic devices 110-1 and 110-2, and the access point 112.

In some implementations, the access point 112 can group the electronic devices 110 into a target station set. The target station set concept comes from downlink multi-user transmission where the access point 112 can transmit to multiple stations simultaneously in one PPDU using Orthogonal Frequency Division Multiple Access (OFDMA) or multiuser (MU) Multiple Input Multiple Output (MU-MIMO). Here, the target station set is a set of stations that can simultaneously be served by the access point 112. The stations in the set do not need to share the same PHY parameters, such as MCS, number of streams, etc.

In some implementations, the access point 112 can simultaneously communicate with a plurality of electronic devices 110 using multiuser (MU) techniques, such as MU Multiple Input Multiple Output (MU-MIMO). In some examples, the access point 112 communicates with the electronic devices 110 using frequency multiplexing such that the access point 112 allocates each of the electronic devices a portion of the overall bandwidth. For example, to simultaneously communicate with four electronic devices over an 80 Megahertz (MHz) bandwidth, the access point 112 transmits a MU-PPDU over the 80 MHz bandwidth. The MU-PPDU includes a sub-PPDU for each of the four electronic devices, where each sub-PPDU (or sub-channel) is allocated 20 MHz. The access point 112 can use the MU-PPDU to communicate with devices in the same target set, devices in different target sets, or a combination of both.

In some implementations, access point 112 and one or more electronic devices can be compatible with an IEEE 802.11 standard that includes trigger-based channel access, e.g., IEEE 802.11ax. In 802.11ax, Orthogonal Frequency Division Multiple Access (OFDMA) is used to enable simultaneous communications between the access point 112 and multiple electronic devices. OFDMA divides the available physical spectrum into multiple orthogonal sub-channels, or resource units (RUs), which can be allocated to different electronic devices (users). Under the standard, the access point 112 coordinates multiuser OFDMA by broadcasting a trigger frame which, among other things, allocates a RU to each participating electronic device. Each electronic device responds to the trigger frame by transmitting a PPDU to the access point 112 using the allocated RU. The trigger frame can also include power control information. The access point 112 can instruct all electronic devices 110 when to start and stop transmitting. Note that access point 112 and the electronic devices 110 can communicate with one or more legacy electronic devices that are not compatible with the IEEE 802.11 standard (i.e., that do not use multi-user trigger-based channel access).

In some implementations, processing a packet or frame in one of electronic devices 110 access point 112, or a combination of both, includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

As discussed above, a non-AP STA's transmit power is approximately 10 dB less than that of an AP STA due to, for example, government regulations and implementation differences. This 10 dB transmit power difference can also be viewed as a 7 dB link budget difference, as an AP STA typically has more antennas than a non-AP STA (e.g., an AP STA has four antennas, whereas a non-AP STA has two). Thus, to improve the reliability of transmission in the uplink direction (e.g., from a non-AP STA to an AP STA or another non-AP STA), there is a need to improve the transmit power of non-AP STAs by, for example, 10 dB or otherwise reduce the 7 dB link budget difference. Stated differently, there is a need for a PPDU design which works with, for example, 10 dB lower SNR in the uplink direction than in the downlink direction (e.g., from an AP STA to a non-AP STA).

In general, when receiving a PPDU, a Wi-Fi receiver performs packet detection (e.g., based primarily on the legacy short training field (L-STF)), center frequency offset (CFO) estimation and correction (e.g., coarse tuning using L-STF, and fine tuning using legacy long training field (L-LTF)), channel estimation, demodulation, and decoding. Thus, in a low SNR region (e.g., uplink), it may help to use a longer sequence than L-STF to improve packet detection and coarse CFO correction.

Figure 2A:
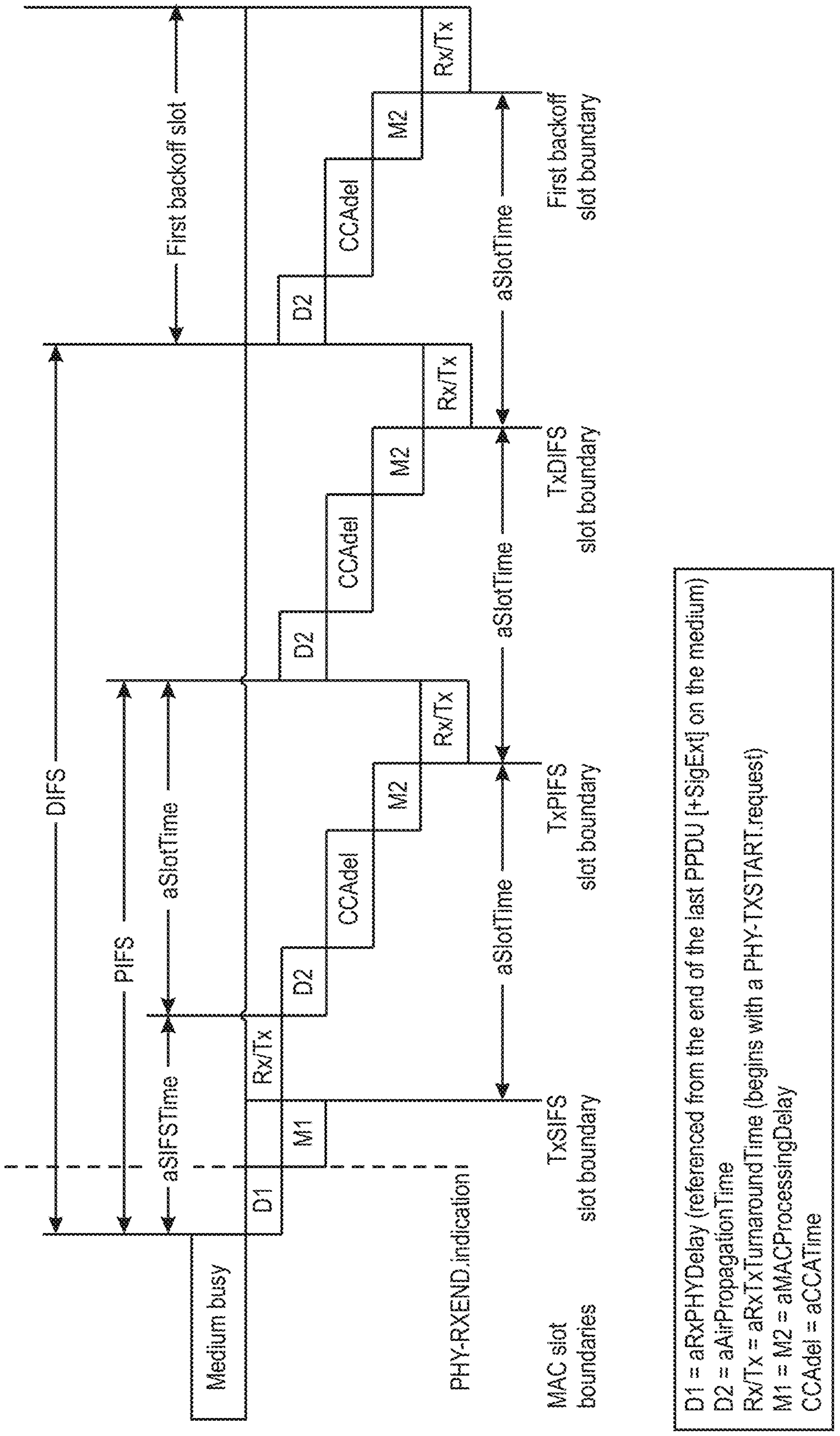
FIGS. 2A and 2B illustrate timing diagrams, according to some implementations.
Figure 2B:
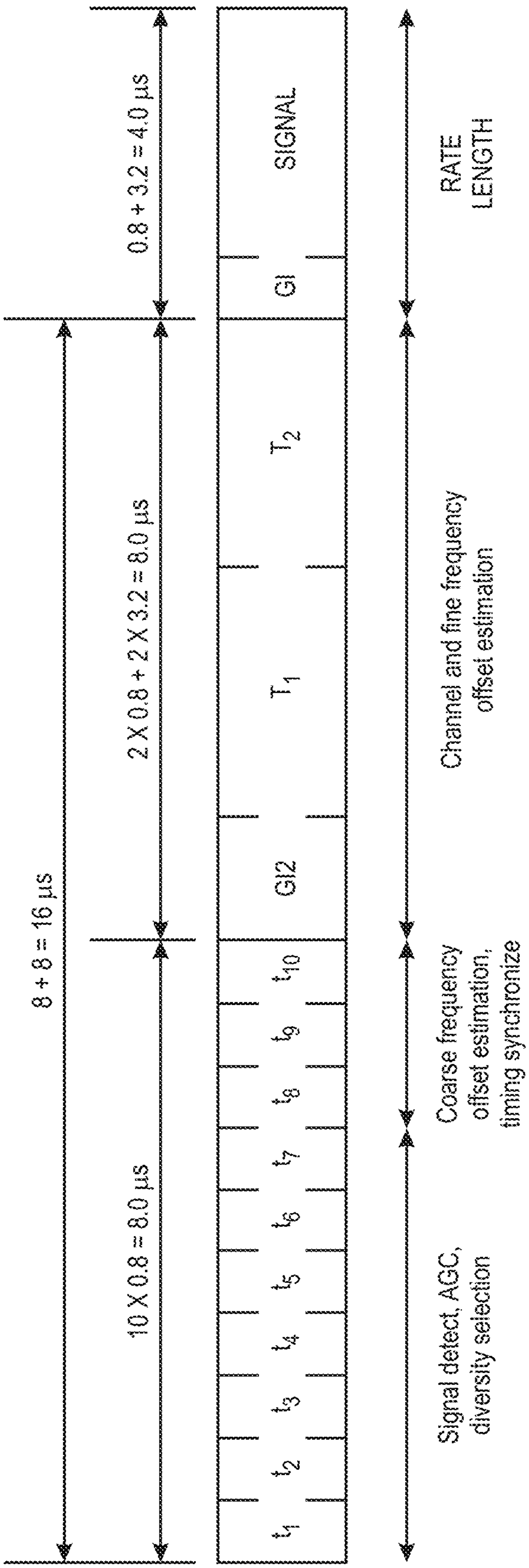

However, as shown in FIG. 2A, each STA needs to check whether the channel is clear during aSlotTime (by performing clear channel assessment (CCA) within aCCATime), which is 9 μs for 20 MHz channel spacing. With this in mind, packet detection should be completed within L-STF, which is less than 8 μs, as shown in FIG. 2B. As such, using a longer sequence than L-STF is not possible within the Wi-Fi framework, as doing so would disrupt the legacy CCA procedure by forcing the receiver to wait longer than the slot time to determine whether it received a new PPDU.

In accordance with an aspect of the present disclosure, it is considered whether there is a better sequence than L-STF that can be used, or whether L-STF can be used with a different assumption. For purposes of discussion and without limitation, it is assumed that a non-AP STA has two antenna, and that an AP STA has four antennas.

Figure 3:
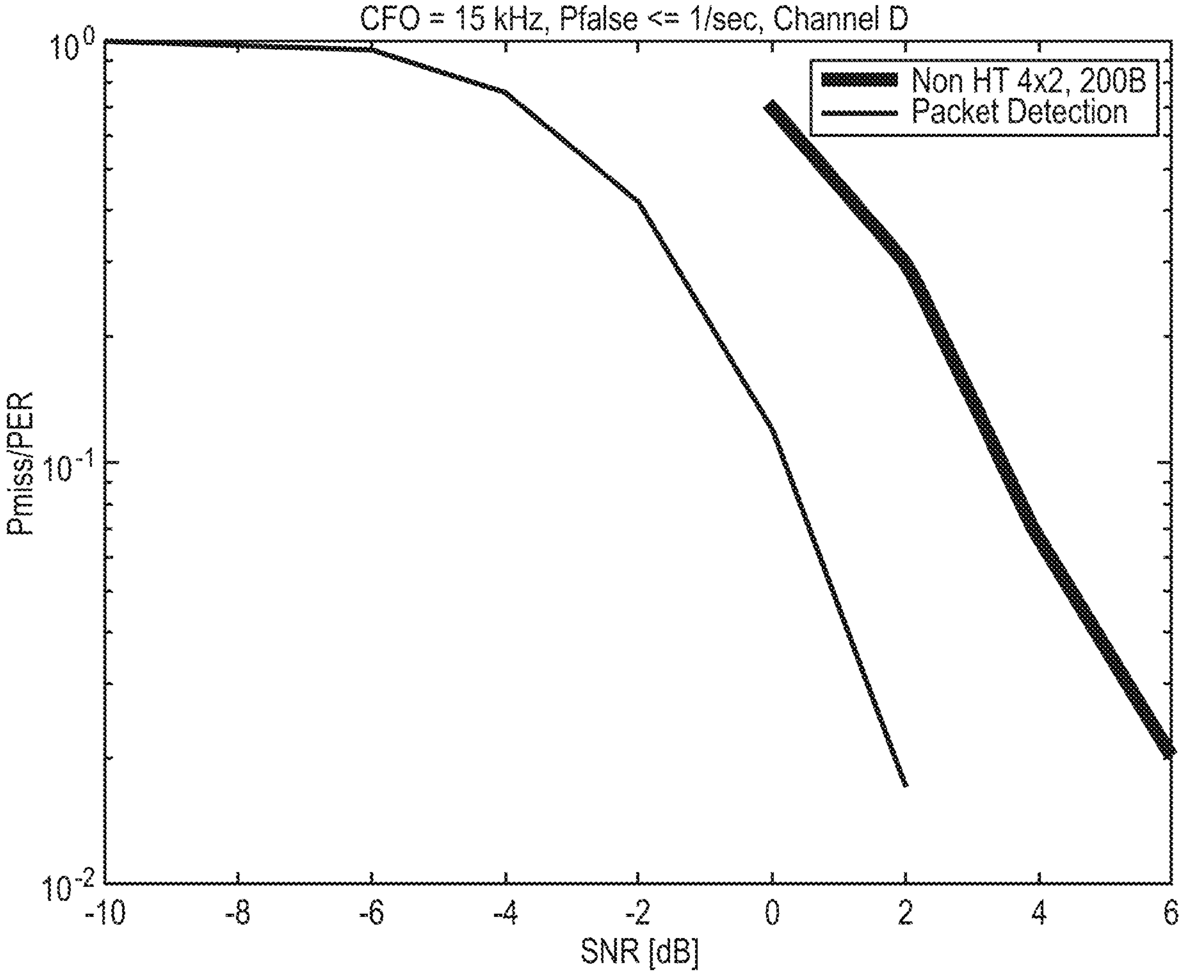
FIG. 3 illustrates simulation results for packet detection, according to some implementations.

In general, a non-AP STA's MCSO (beacon) sensitivity is at least 3 dB worse than Pmiss (packet detection) for a non-high throughput (non-HT) PPDU, as shown in FIG. 3 and summarized in the following table. Thus, to overcome the aforementioned 10 dB transmit power difference, the packet detection performance should be improved by at least 6.7 dB (e.g., 10 dB-3.3 dB).

| | Required SNR |
|---|---|
| Data | 3.5 dB |
| PD | 0.2 dB |
| Difference | 3.3 dB |

Typically, a WLAN receiver uses auto-correlation for packet detection due to CFO. However, auto-correlation is limited in very low SNR regions. Thus, in accordance with an aspect of the present disclosure, cross correlation is used in order to improve packet detection. To use cross correlation based algorithm, the amount of phase difference should be small within the sequence used for the correlation. If a STA can correct CFO before transmission, then the receiver does not need to correct CFO before processing other fields. For trigger-based (TB) PPDUs, a requirement for the 10% point of the complementary cumulative distribution function (CCDF) of CFO errors in additive gaussian white Gaussian noise (AWGN) at a received signal strength indicator (RSSI) of −60 dBm in 20 MHz is 350 Hz for high-efficiency (HE) TB PPDUs, and 2 kHz for a non-HT PPDUs or non-HT duplicate transmissions. In some examples, CFO requirements for transmissions other than TB PPDU is +/−20 ppm. If it is assumed that 3 dB SNR is needed on the downlink for beacon, a 15 kHz residual CFO can be achieved at the 1-percentile, or 8.4 kHz residual CFO at the 10-percentile. Thus, in accordance with an aspect of the present disclosure, it is proposed to impose a tight CFO requirement (e.g., less than or equal to 15 kHz residual CFO error) before transmitting the extended range PPDU described herein.

Figure 4:
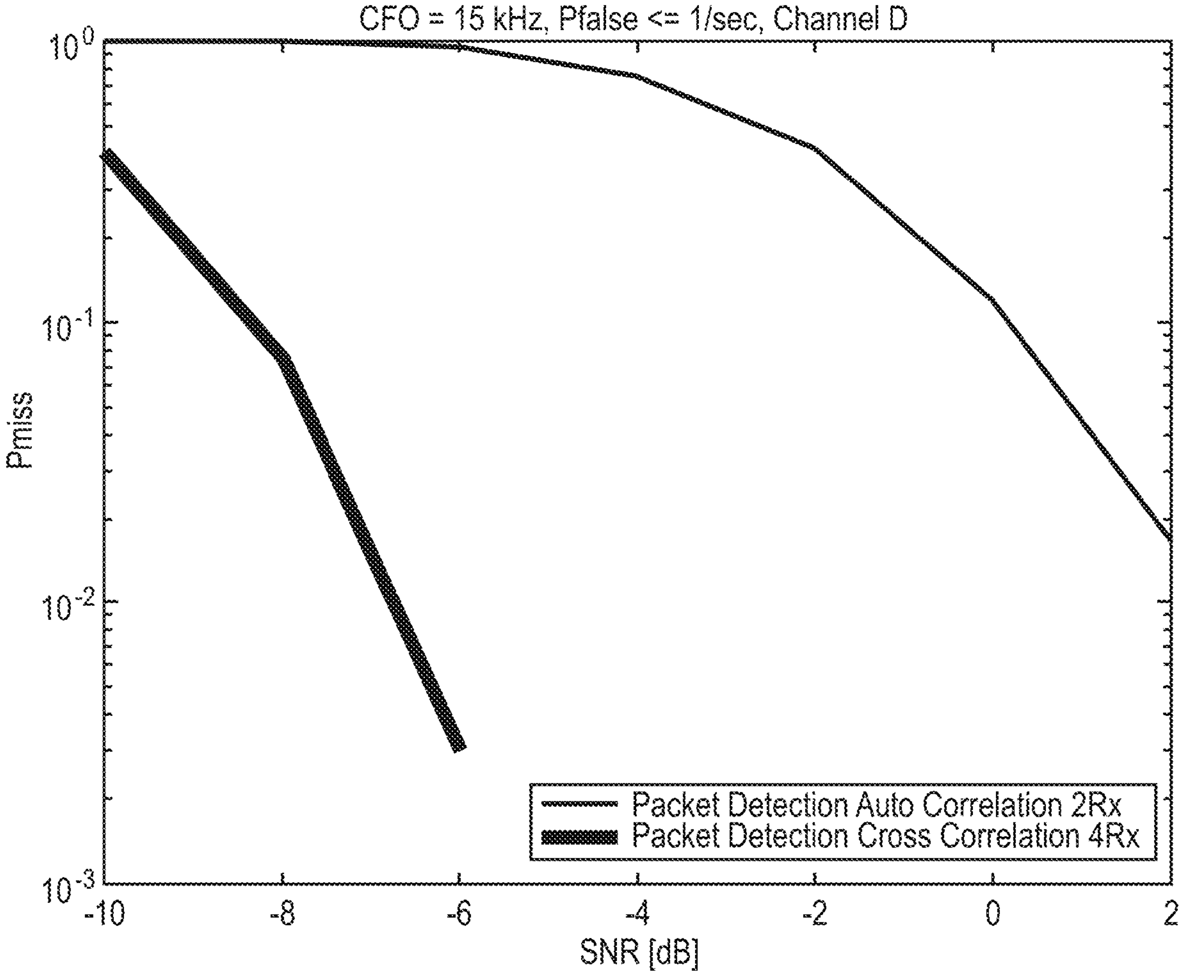
FIG. 4 illustrates simulation results for auto correlation and cross correlation based packet detection, according to some implementations.

By reducing the CFO, a longer sequence can be used for cross correlation, thereby improving packet detection. For example, the amount of value difference due to CFO in cross correlation is $N^2-|\Sigma_k e^{j2\pi kct}|s_k|^2|^2$, where N is the number of samples in the sequence, c is the residual CFO value, and t is time. Thus, a 15 kHz residual CFO leads to a 0.036 radian change for 2.4 μs, which is (0.9745+0.2243j)*signal. For a 15 kHz residual CFO case, the value difference is 0.07 dB. Note that for a 150 kHz residual CFO case, the value difference is 2 dB. Thus, as long as the residual CFO value is not overly large, the packet detection threshold still works. As shown in FIG. 4, with L-STF power boosted by 3 dB and cross correlation without CFO correction and with residual CFO of 15 kHz, an 8.5 dB gain is achieved. Note that the auto-correlation based method shown in FIG. 4 uses a 0.8 μs correlator.

Figure 5A:
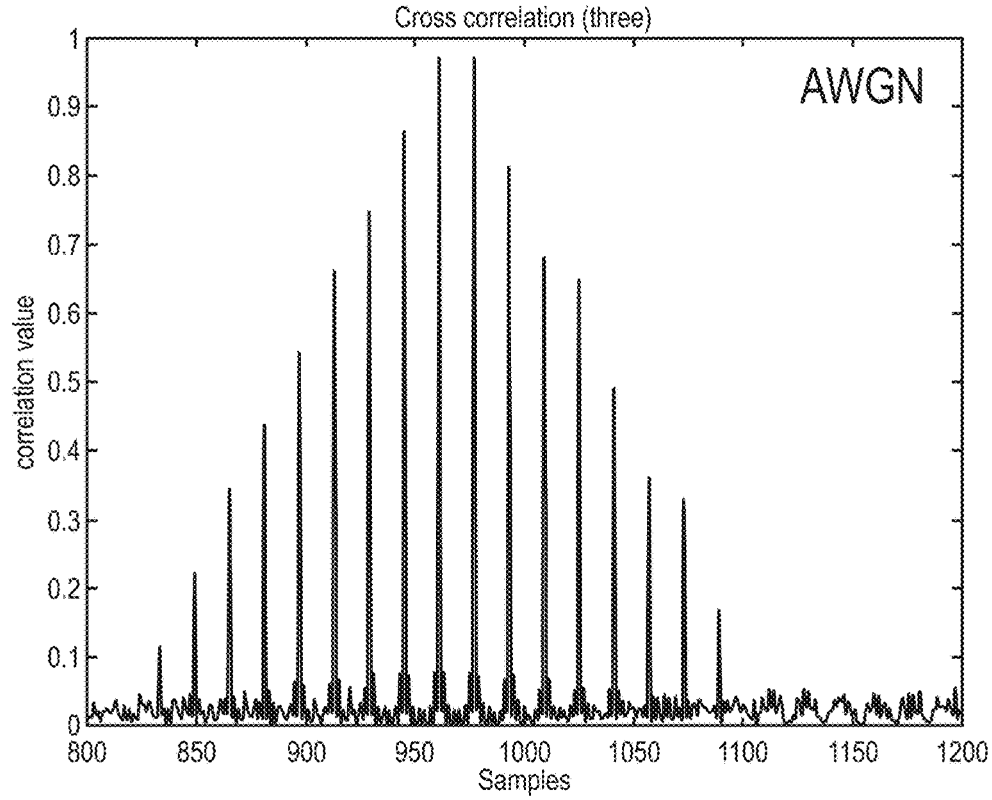
FIGS. 5A-5H illustrate simulation results for cross correlation based packet detection, according to some implementations.
Figure 5B:
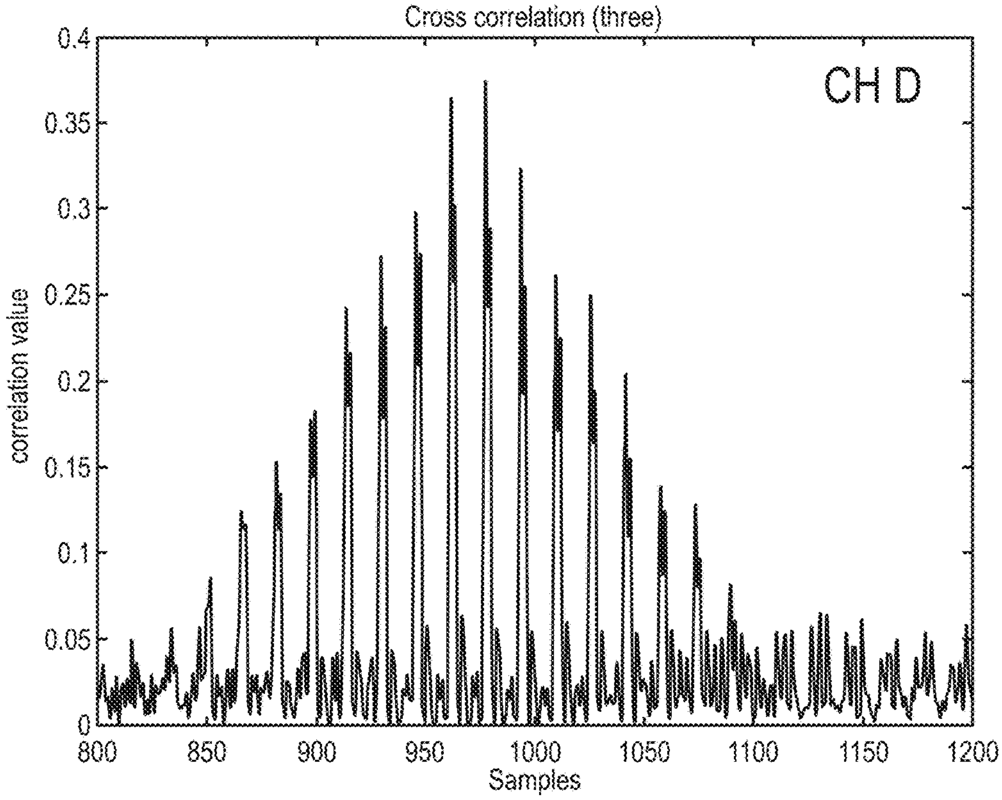
Figure 5C:
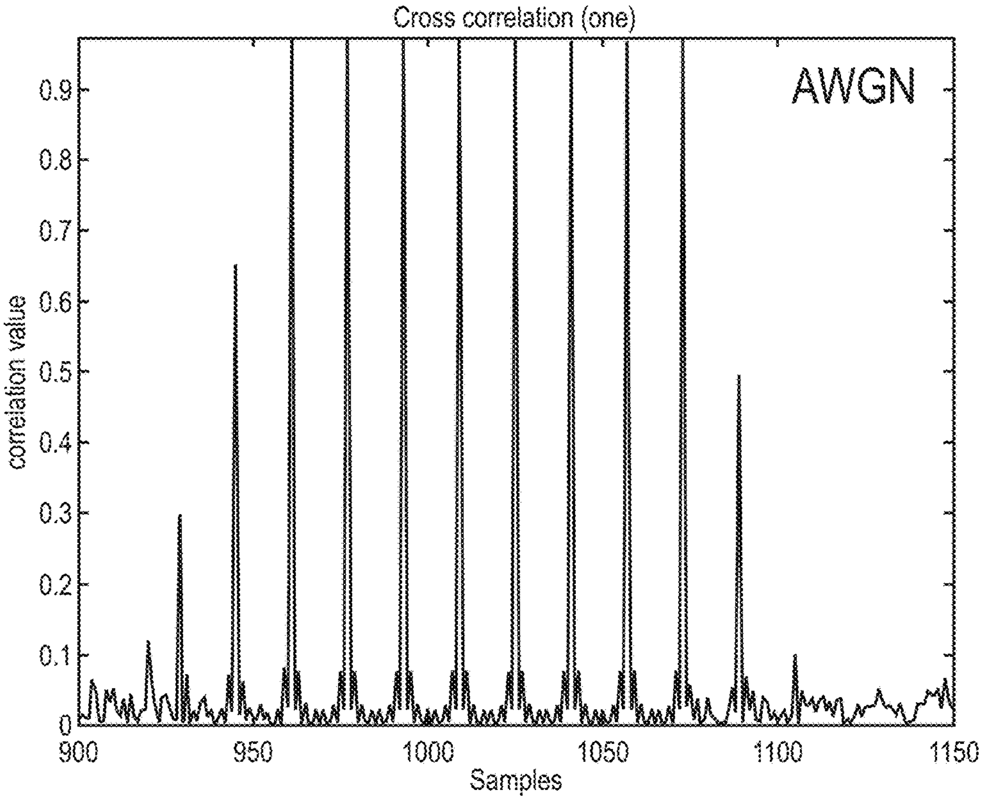
Figure 5D:
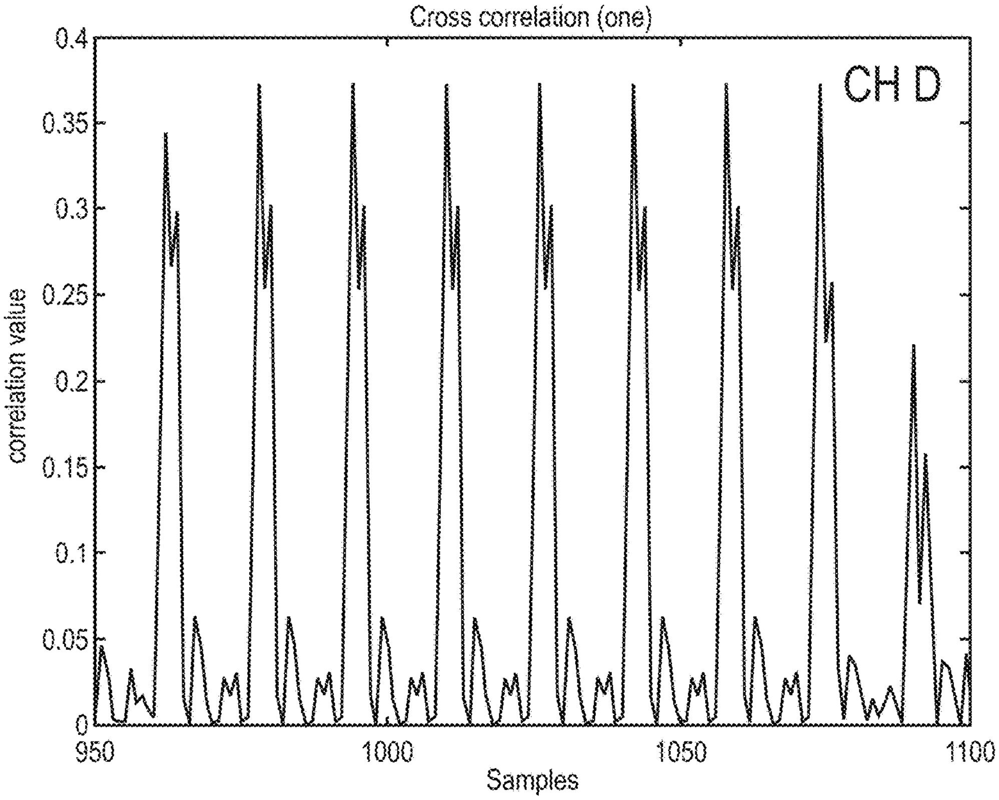
Figure 5E:
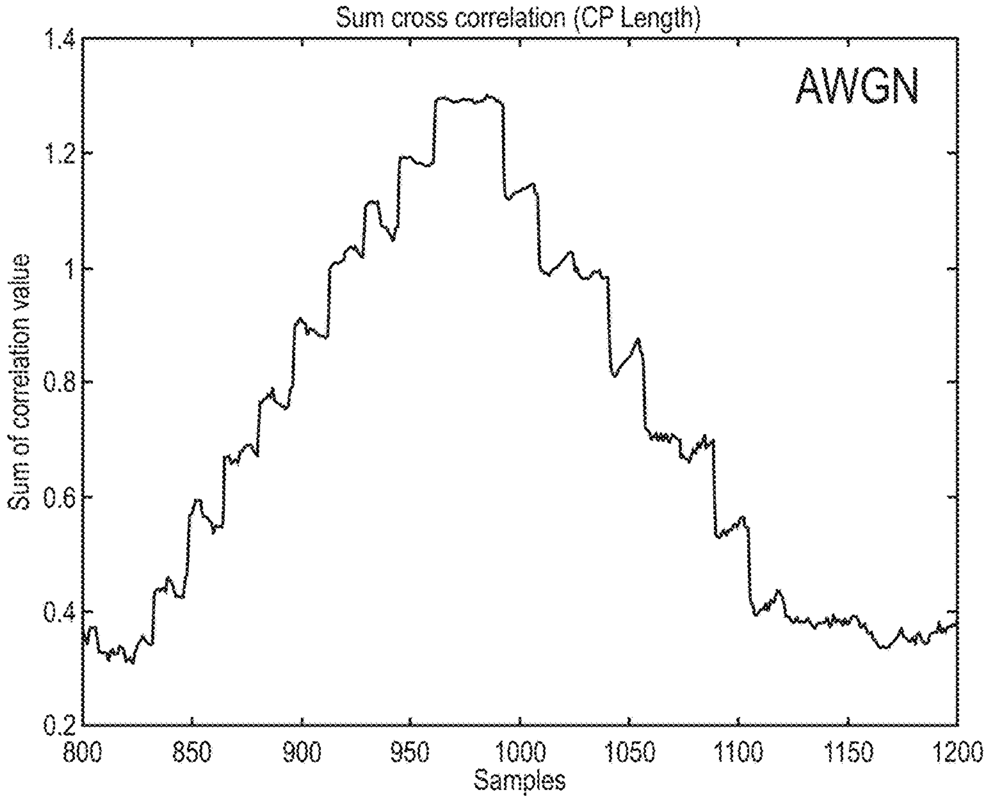
Figure 5F:
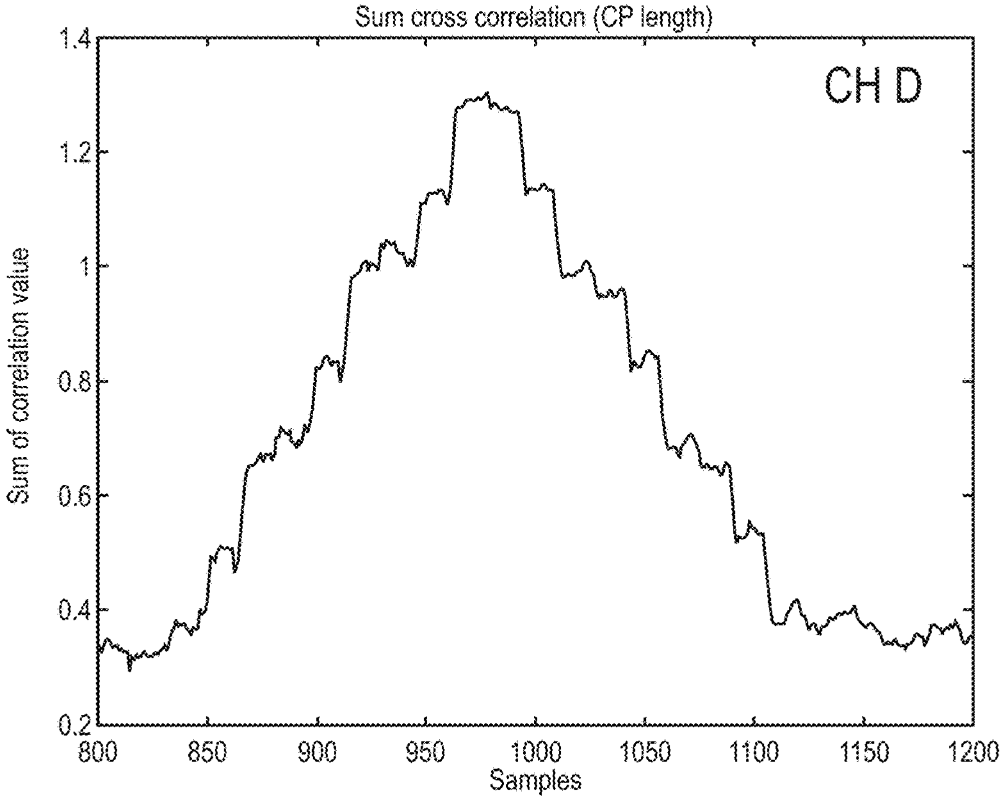
Figure 5G:
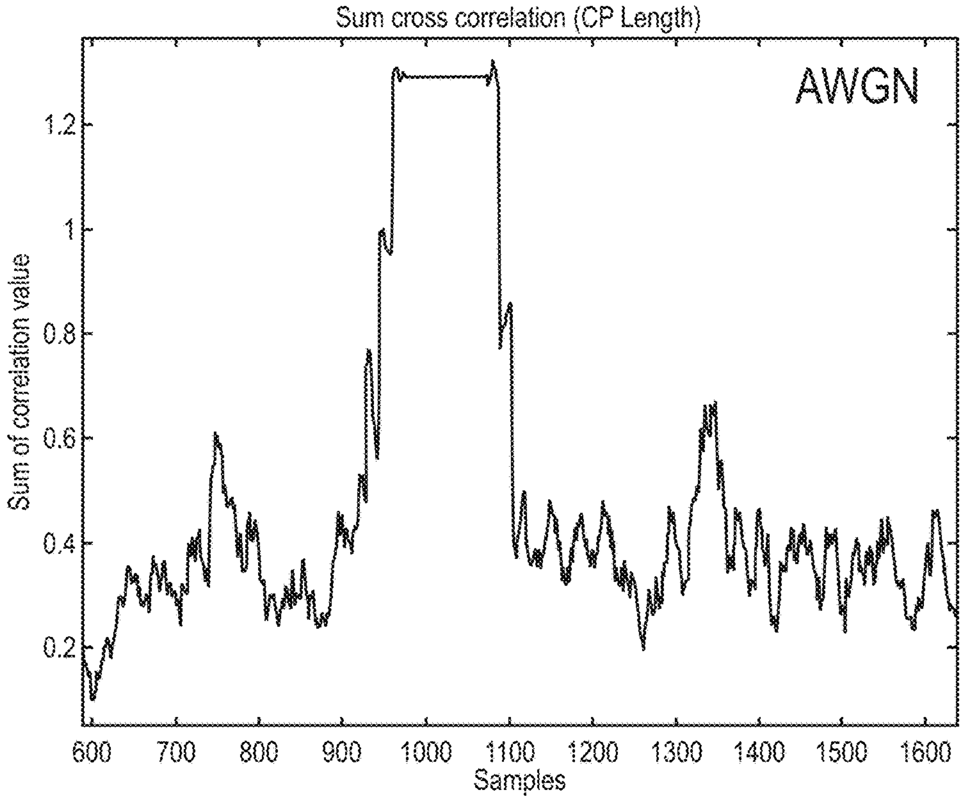
Figure 5H:
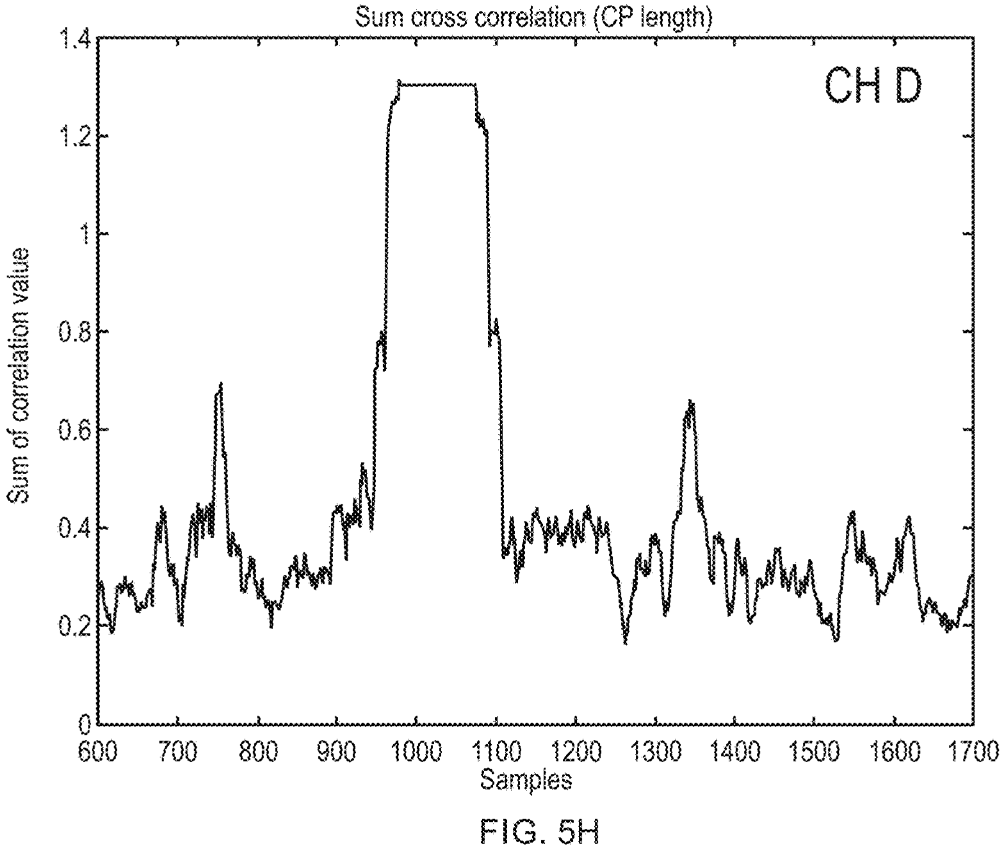

In some examples, cross correlation based packet detection can be performed as follows. First, a sum of three correlators is determined. For example, a cross correlation of a reference STF (e.g., length 48 or 2.4 μs) with three input signals (e.g., current, 48 delayed, 96 delayed) normalized with the signal strength of the input sequence can be determined, as shown in FIGS. 5A and 5B. Alternatively, one correlator can be used and the values saved, as shown in FIGS. 5C and 5D. In some examples, a flag can be set after detecting a first correlator above some value, which can then be confirmed after checking a delayed version. From here, a sum of the above value for 0.8 μs is determined to capture the energy in different channel taps. This is shown, for example, in FIGS. 5E and 5F (three correlators) and FIGS. 5G and 5H (one correlator). Lastly, it is determined whether a packet is detected by checking whether the sum values above the threshold exceed X times for 3.2 μs (64 samples) after the sum value exceeds the threshold Y. As an example, X can be 45, and Y can be 0.5.

Figure 6:
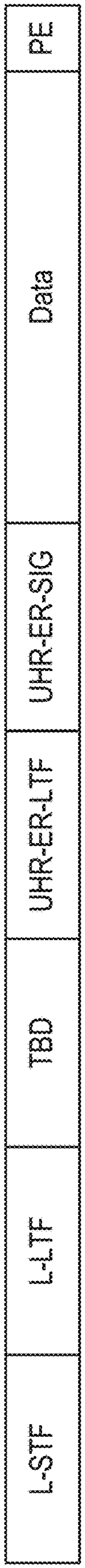
FIG. 6 illustrates an example structure for an ultra-high reliability extended range PPDU (UHR ER PPDU), according to some implementations.

In accordance with an aspect of the present disclosure, an ultra-high reliability extended range PPDU (UHR ER PPDU) format is disclosed. Such a format can, for example, improve SIG decoding performance and SNR, as described below. Referring to FIG. 6, an example UHR ER PPDU format is shown. In this example, the UHR ER PPDU includes L-STF, L-LTF, TBD, UHR-ER-LTF, UHR-ER-SIG, Data, and PE fields. In some examples, L-STF and L-LTF are power boosted by 3 dB. The fields between L-LTF and UHR-ER-LTF (designated TBD in FIG. 6) are described in further detail below. In some examples, the PE field can be omitted.

Figure 7:
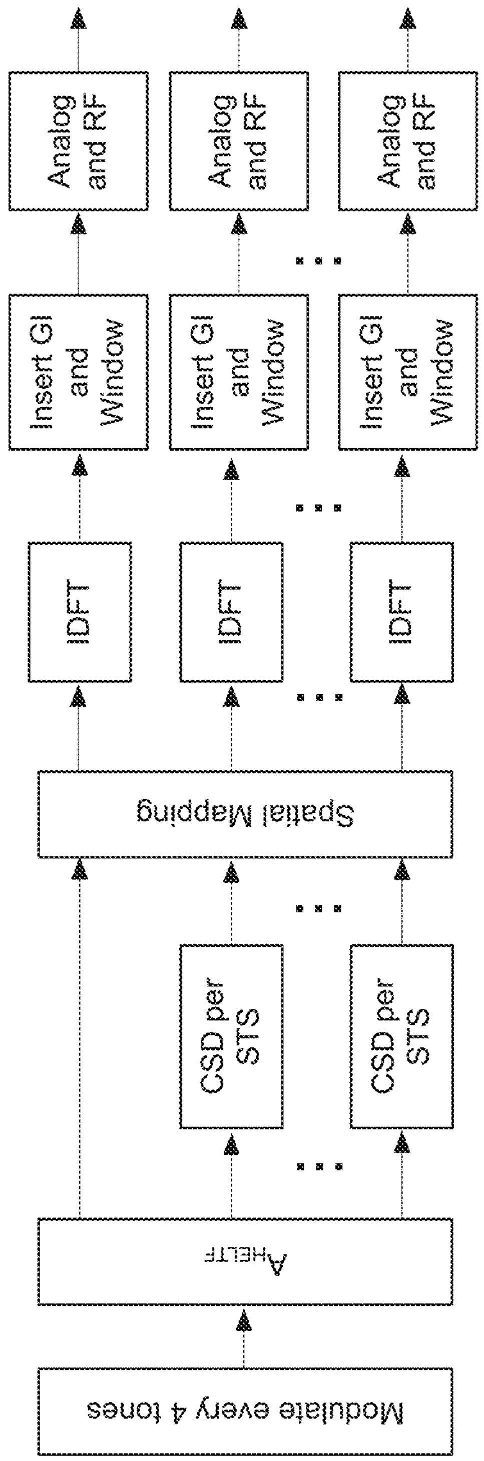
FIG. 7 illustrates an example diagram for producing a 1× format over an entire orthogonal frequency division multiplexing (OFDM) symbol, according to some implementations.

In order to boost the receive power, the UHR-ER-LTF and/or UHR-ER-SIG fields can use a 1× format, but over the full OFDM symbol length. Here, 1× format refers to the duration of the symbol (e.g., OFDM symbol) containing the UHR-ER-LTF or UHR-ER-SIG. In some examples, 1× format corresponds to a symbol duration of 3.2 μs (obtained through ¼ compression of a 12.8 μs OFDM symbol), whereas 2× format corresponds to a symbol duration of 6.4 μs (obtained through ½ compression), and 4× format corresponds to a symbol duration of 12.8 μs (uncompressed). To increase the receive power in accordance with an aspect of the present disclosure, a 1× format UHR-ER-LTF and/or UHR-ER-SIG (nominally 3.2 μs) is modulated over the full OFDM length (e.g., 12.8 μs), such as by using every fourth subcarrier. An example diagram for producing such a signal (e.g., UHR-ER-LTF and/or UHR-ER-SIG) is shown in FIG. 7.

In some examples, the UHR-ER-LTF and/or UHR-ER-SIG fields are repeated four times in time domain, which will result in 6 dB power boosting effect. These fields can use the same FFT size as the HE/EHT/UHR data field (e.g., 256 for 20 MHz, 512 for 40 MHz). The OFDM symbol length (e.g., duration) is 12.8 μs plus a guard interval (e.g., 3.2 μs), resulting in a total OFDM symbol length of 16 μs. In some examples, there are non-zero values in every fourth subcarrier. For wider than 20 MHz bandwidth, all non-punctured 20 MHz can be identical.

In some examples, a 52-tone resource unit (RU) in 20 MHz with 4× subcarrier location that of non-HT PPDU is used for the UHR-ER-LTF and/or UHR-ER-SIG fields. For UHR-ER-LTF, the modulation can be the same as or similar to L-LTF in non-HT DUP PPDU, except modulated subcarriers indices are every 4th tone. For UHR-ER-SIG, the modulation and coding (e.g., BPSK, BCC R=½) can be the same as or similar to that of L-SIG in non-HT DUP PPDU, except modulated subcarriers indices are every 4th tone. In 20 MHz, subcarrier indices [−26, −25, . . . 25, 26] can become [−104, −100, . . . , 100, 104], respectively. In some example, pilots can be boosted by 3 dB.

In some examples, a HE/EHT/U-SIG tone plan is used for the UHR-ER-LTF and/or UHR-ER-SIG fields. For UHR-ER-LTF, the modulation is the same as or similar to L-LTF in HE/EHT PPDU, except modulated subcarriers indices are every 4th tone. For UHR-ER-SIG, the modulation and coding (e.g., BPSK, BCC R=½) is the same as or similar to that of U-SIG, except modulated subcarriers indices are every 4th tone and over one symbol. In 20 MHz, subcarrier indices [−28, −27, . . . 27, 28] can become [−112, −108, . . . , 108, 112], respectively. In some example, the data field can use the same structure as the UHR-ER-LTF and/or UHR-ER-SIG fields.

As discussed above, to improve the packet detection performance, power boosting of L-STF and L-LTF (e.g., by 3 dB) with CFO correction can be used. In some examples, the L-STF and/or the L-LTF fields of the PPDU (e.g., the UHR ER PPDU) can be power boosted by more than 3 dB (e.g., 5 dB) to improve packet detection performance without CFO correction (although CFO correction can be used with L-STF/L-LTF boosted by more than 3 dB in some examples). In general, power boosting fields (e.g., L-STF and L-LTF, among other fields) refers to increasing the transmission power for those fields. The maximum power boost that can be applied in a particular implementation may vary due to transmission requirements, such as maximum transmission power level and transmit spectral mask. If it is possible to apply a 5 dB power boost to L-STF and L-LTF in a particular implementation, then such a 5 dB boost may be applied to improve the packet detection performance without CFO correction. On the other hand, if a power boost of, e.g., 5 dB is not possible in a particular implementation, then CFO correction may be performed with a lower (e.g., 3 dB) power boost to L-STF and L-LTF to achieve the desired packet detection performance.

Figure 8:
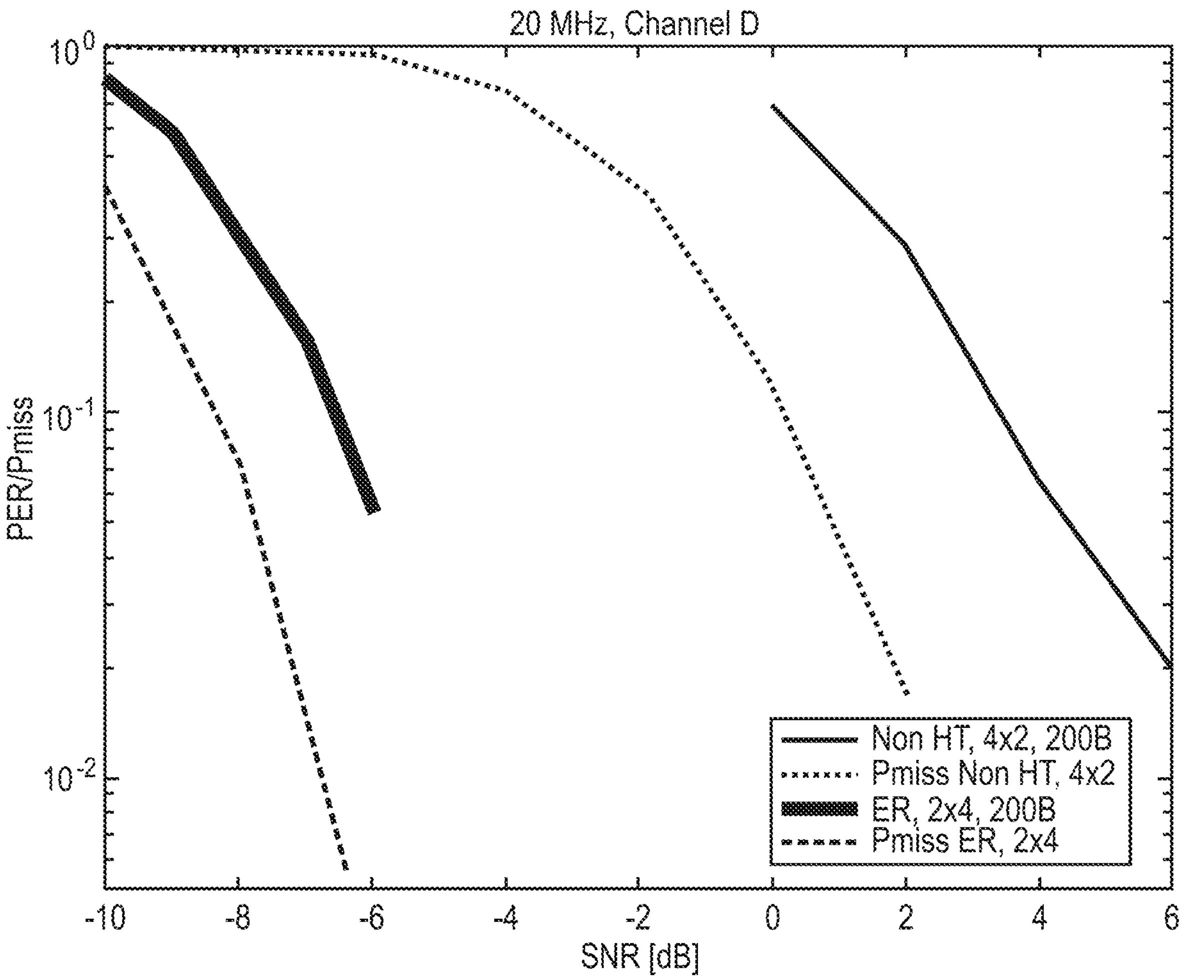
FIG. 8 illustrates simulation results for a non-high throughput PPDU and an UHR ER PPDU, according to some implementations.

Referring to FIG. 8, simulation results for a non-HT PPDU and the proposed UHR ER PPDU are shown. For the non-HT PPDU, a 4 transmitter (Tx) with cyclic delay diversity (CDD) and 2 receiver (Rx) with 200 B (byte) data length and binary convolution code (BCC) is used. For the UHR ER PPDU, a 2 Tx (CDD) and 4 Rx with 200 B BCC is used. In this example, the residual CFO is 15 kHz, L-STF and L-LTF in the UHR ER PPDU are power boosted by 3 dB, UHR-ER-LTF, and UHR-ER-SIG and UHR-ER-DATA follow the legacy tone plan with 4× subcarrier location (e.g., 1× format with full 4×OFDM symbol duration). As UHR-ER-LTF, UHR-ER-SIG, and UHR-ER-DATA are repeated 4 times in time domain, they could be used for CFO correction. In this example, CFO is estimated during UHR-ER-LTF, and residual phase offset is compensated by pilots. In addition, the data rate in this example is 1.5 Mbps (e.g., 6 Mbps/4). As shown in FIG. 8, the UHR ER PPDU described herein performs 10 dB better than the non-HT PPDU, thereby improving uplink SNR and offsetting the link budget difference.

In general, it can be beneficial to have a shorter UHR ER PPDU format in some instances in order to, for example, reduce latency and the chance of collisions. For example, to help address the hidden node problem, some networks (e.g., Wi-Fi networks) can use a request to send and clear to send (RTS/CTS) procedure. During this procedure, a transmitter (e.g., a non-AP STA) sends a RTS to a receiver (e.g., an AP). In response, the receiver sends a CTS to the transmitter, and the transmitter can then send a PPDU. In this case, the receiver (and other STAs within range) should not transmit until the end of the PPDU to avoid collisions, though there are instances in which collisions may still occur (such as when there is an exposed node). As such, it can be beneficial to have a shorter PPDU format in order to reduce latency and further reduce the chance of collisions, keeping in mind potential tradeoffs on compatibility and functionality.

Figure 9A:
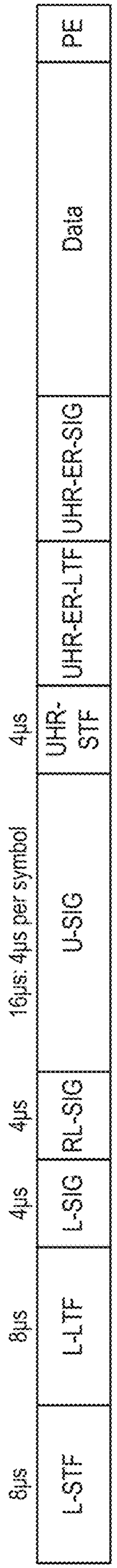
FIGS. 9A and 9B illustrate example structures for an UHR ER PPDU including an extended range (ER) preamble, according to some implementations.
Figure 9B:
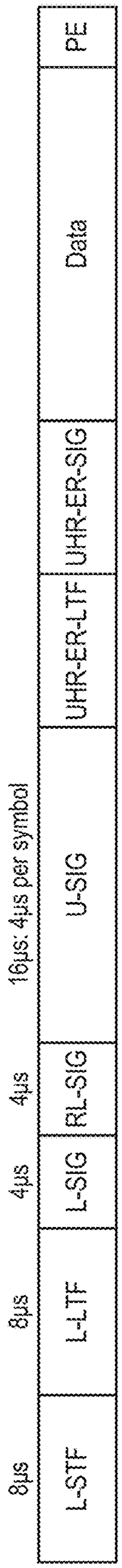

Referring to FIGS. 9A and 9B, example formats for the UHR ER PPDU are proposed, in accordance with an aspect of the present disclosure. In general, the fields between L-LTF and UHR-ER-LTF are not needed for the intended receiver. Thus, it is proposed to use an ER preamble structure so that more STAs can decode the preamble and defer to the end of PPDU. Such an ER preamble can include an L-SIG field, an RL-SIG field, a U-SIG field, and a UHR-STF field, as shown in FIG. 9A. In some examples, the UHR-STF field can be omitted, as shown in FIG. 9B. In some examples, the PE field can be omitted.

Figure 10A:
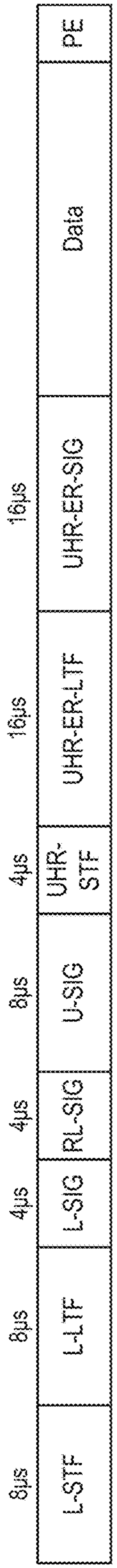
FIGS. 10A and 10B illustrate examples structures for an UHR ER PPDU including an UHR preamble, according to some implementations.
Figure 10B:
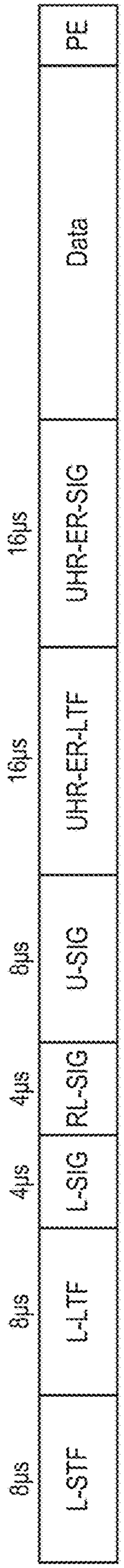

FIGS. 10A and 10B illustrate additional example formats for the UHR ER PPDU, in accordance with an aspect of the present disclosure. As noted above, the fields between L-LTF and UHR-ER-LTF are not needed for the intended receiver. Further, in some examples, the ER preamble may be too long. Thus, it is proposed to use a UHR PPDU preamble structure, as shown in FIG. 10A. In some examples, the UHR-STF field can be omitted, as shown in FIG. 10B. In some examples, the PE field can be omitted.

Note that not all STA in the basic service set may be able to decode the packet, which may be addressed by using UHR ER PPDU to carry RTS (or variation of it) and CTS by AP (using non-HT/non-HT DUP).

Figure 11:
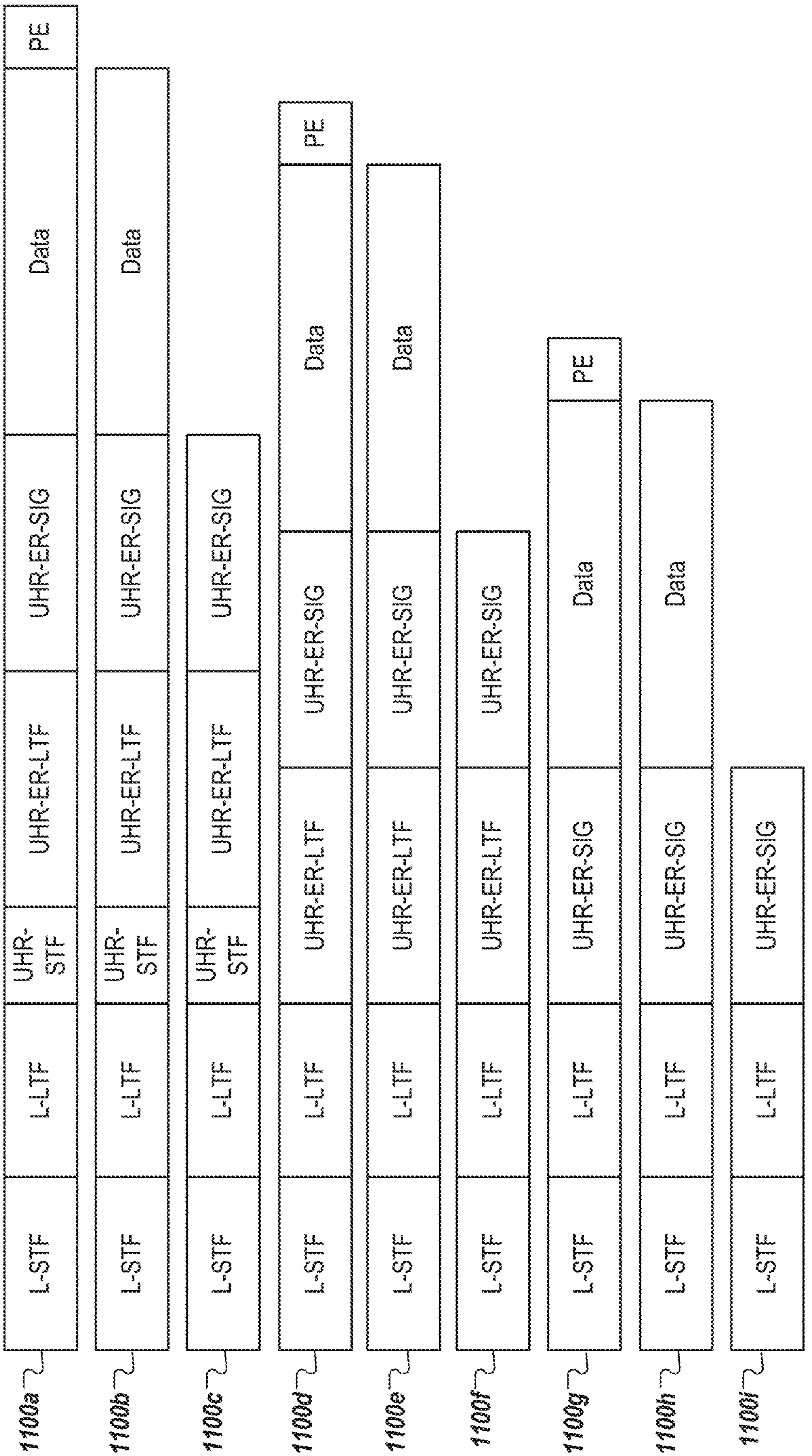
FIG. 11 illustrates example structures for an UHR ER PPDU in which a legacy signal (L-SIG) field is omitted, according to some implementations.
Figure 12:
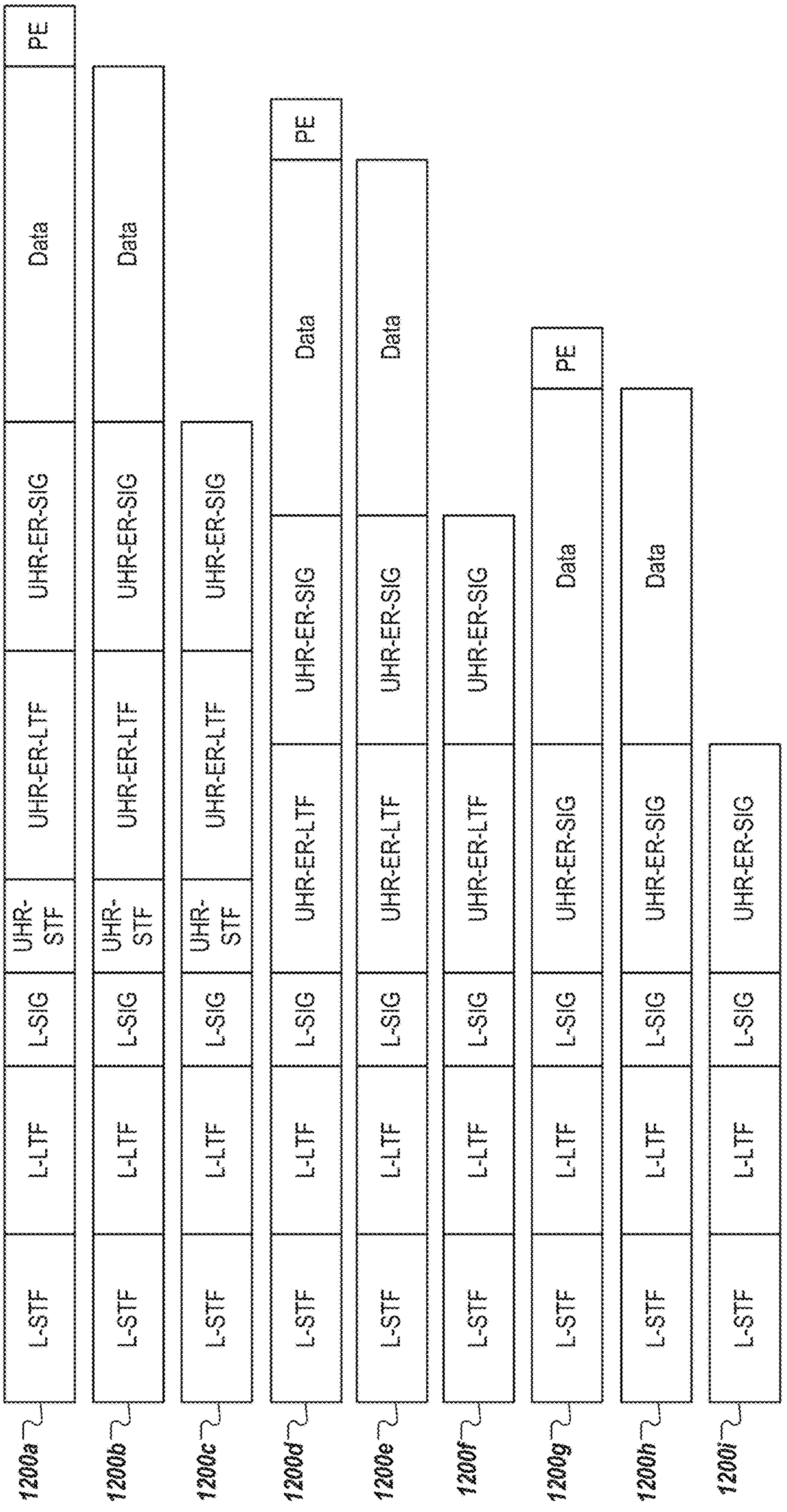
FIG. 12 illustrates example structures for an UHR ER PPDU in which a repeated legacy signal (RL-SIG) field is omitted, according to some implementations.
Figure 13:
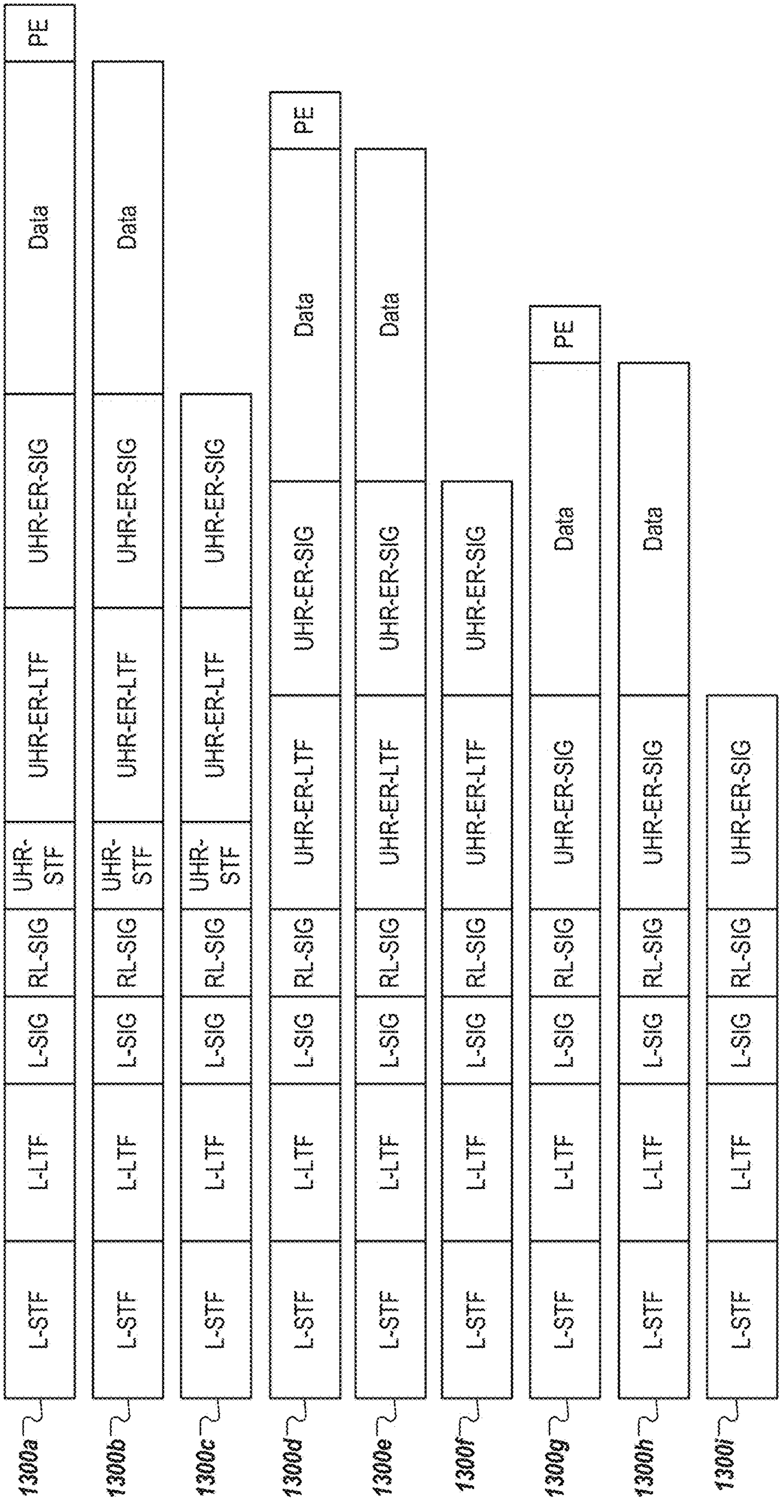
FIG. 13 illustrates example structures for an UHR ER PPDU in which a universal signal (U-SIG) field is omitted, according to some implementations.

FIGS. 11, 12, and 13 illustrate further examples of UHR ER PPDU formats, in accordance with aspects of the present disclosure. Referring to FIG. 11, example UHR ER PPDU formats 1100*a*-1100*i* are shown in which the L-SIG field (and RL-SIG field) is omitted. Such formats can be useful, for example, in instances where the ER PPDU does not need to be detected by non-intended STA(s). In some examples, the UHR-STF field can be omitted in addition to the L-SIG field (as well as other fields), such as shown in formats 1100*d*-1100*i*. Such formats can be useful, for example, when beamforming is not applied. In some examples, the UHR-ER-LTF field can be omitted in addition to the L-SIG field (as well as other fields), such as shown in formats 1100*g*-1100*i*. Such formats can be useful, for example, when channel estimation from L-LTF can be used for the UHR-ER-SIG and/or data fields. In some examples, such as when there is no data to send, the data field can be omitted in addition to the L-SIG field (as well as other fields), such as shown in formats 1100*c*, 1100*f*, and 1100*i*. In some examples, the PE field can be omitted in addition to the L-SIG field (as well as other fields), such as shown in formats 1100*b*-1100*c*, 1100*e*-1100*f*, and 1100*h*-1100*i*.

Referring to FIG. 12, example UHR ER PPDU formats 1200*a*-1200*i* are shown in which the RL-SIG field is omitted. Such formats can be useful, for example, in instances where a non-intended STA or legacy STA will treat the ER PPDU as a non-HT PPDU. In some examples, the UHR-STF field can be omitted in addition to the RL-SIG field (as well as other fields), such as shown in formats 1200*d*-1200*i*. Such formats can be useful, for example, when beamforming is not applied. In some examples, the UHR-ER-LTF field can be omitted in addition to the RL-SIG field (as well as other fields), such as shown in formats 1200*g*-1200*i*. Such formats can be useful, for example, when channel estimation from L-LTF can be used for the UHR-ER-SIG and/or data fields. In some examples, such as when there is no data to send, the data field can be omitted in addition to the RL-SIG field (as well as other fields), such as shown in formats 1200*c*, 1200*f*, and 1200*i*. In some examples, the PE field can be omitted in addition to the RL-SIG field (as well as other fields), such as shown in formats 1200*b*-1200*c*, 1200*e*-1200*f*, and 1200*h*-1200*i*.

Referring to FIG. 13, example UHR ER PPDU formats 1300*a*-1300*i* are shown in which the U-SIG field is omitted. Such formats can be useful, for example, in instances where a legacy STA will treat the ER PPDU as a non-HT PPDU. In some examples, the UHR-STF field can be omitted in addition to the U-SIG field (as well as other fields), such as shown in formats 1300*d*-1300*i*. Such formats can be useful, for example, when beamforming is not applied. In some examples, the UHR-ER-LTF field can be omitted in addition to the U-SIG field (as well as other fields), such as shown in formats 1300*g*-1300*i*. Such formats can be useful, for example, when channel estimation from L-LTF can be used for the UHR-ER-SIG and/or data fields. In some examples, such as when there is no data to send, the data field can be omitted in addition to the U-SIG field (as well as other fields), such as shown in formats 1300*c*, 1300*f*, and 1300*i*. In some examples, the PE field can be omitted in addition to the U-SIG field (as well as other fields), such as shown in formats 1300*b*-1300*c*, 1300*e*-1300*f*, and 1300*h*-1300*i*.

In some examples, a meaning of one or more fields or parameters of the SIG field(s) in the UHR ER PPDU can be modified, in accordance with an aspect of the present disclosure. For instance, in some examples, a length field or parameter in the L-SIG field (or RL-SIG field) can be used to indicate the end of a transmission opportunity (TXOP) and/or a TXOP duration, rather than a PPDU end and/or PPDU duration. In some examples, the PPDU Type And Compression Mode field(s) in the U-SIG field can be used to inform that the PPDU is a UHR ER PPDU. In this way, if the intended STA is able to decode the U-SIG field, then the PPDU Type And Compression Mode will confirm that it is in the UHR ER PPDU format.

In some examples, the UHR-ER-SIG field can include one or more of the following fields or parameters to facilitate decoding of the ER PPDU, in accordance with an aspect of the present disclosure. In some examples, the UHR-ER-SIG can include a length field, such as the L-SIG length field or a similar length field (e.g., number of OFDM symbols), so that the intended STA knows the length of the PPDU. In some examples, the UHR-ER-SIG can indicate a modulation coding scheme (MCS) level of the data field (e.g., MSC0, MSC1, etc.). If only one MSC level is used, then this parameter can be omitted. In some examples, the UHR-ER-SIG can include an indication of the coding (e.g., binary convolution code (BCC) or low-density parity check code (LDPC)). If only one type of code is used (e.g., one of BCC or LDPC), then this parameter can be omitted. In some examples, the UHR-ER-SIG can include LDPC Extra Symbol Segment, Pre-FEC Padding Factor, and/or PE Disambiguity fields or parameters. These fields or parameters can be omitted if these values are fixed, such as described below. In some examples, the UHR-ER-SIG can include a BSS Color field or parameter. In some examples, the UHR-ER-SIG can include a STA-ID. In some examples, the UHR-ER-SIG can include a CRC or parity check bit(s). In some examples, the pre-FEC padding factor and/or the LDPC extra symbol segment may be fixed for the ER PPDU. For example, for better coding performance, the LDPC extra symbol can be set to 1, and pre-FEC padding factor can be set to 3. In some examples, padding can be used (e.g., zero length MPDUs at the MAC layer) to satisfy these fixed values.

In some examples, a low imposed error rate could make the ER PPDU longer than legacy PPDUs. To avoid this scenario, a maximum size or length can be imposed on the ER PPDU, in accordance with an aspect of the present disclosure. Such a restriction can be imposed, for example, on ER PPDUs using Enhanced Distributed Channel Access (EDCA). In some examples, a number of OFDM symbols or other length specified in the ER-SIG field can limit the maximum ER PPDU size. In some examples, the AP sets ER-PPDU length limitations for EDCA. For instance, if AP sets ERPPDULengthThreshold, then a non-AP STA shall not send an ER-PPDU using EDCA with PPDU length longer than ERPPDULengthThreshold. In some examples, this limit may only be imposed for data frames, and no limitation (or a different limitation) may be imposed for control, action, and/or management frames. When there is an unassociated STA, there is no STA-ID. In this case, until the AP gets the STA-ID (e.g., after association response frame is successfully delivered to the STA), then the unassociated STA may use the ER PPDU (e.g., for a Probe Request frame, Association Request frame, etc.) without maximum size limits.

Figure 14A:
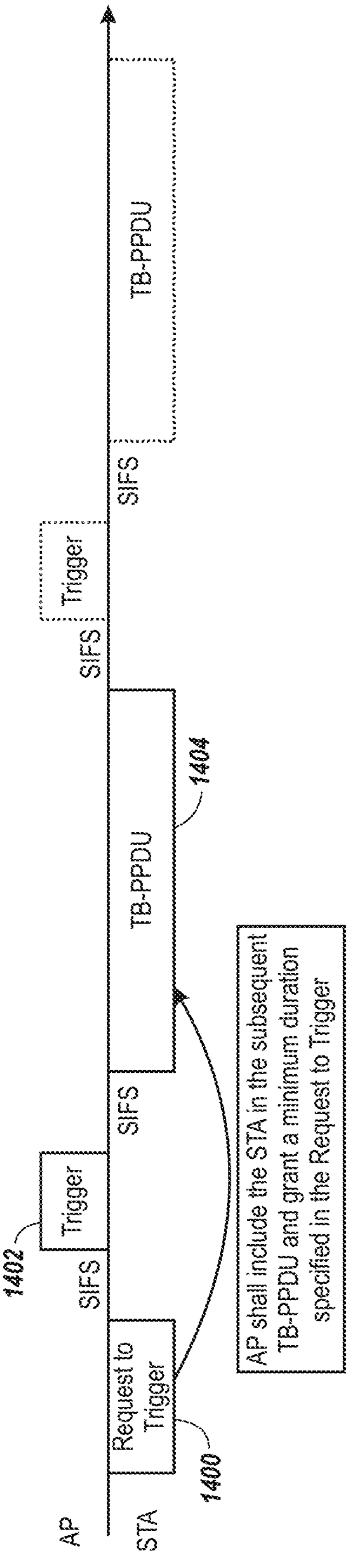
FIGS. 14A and 14B illustrate examples of a trigger procedure, according to some implementations.

In accordance with an aspect of the present disclose, an improved trigger procedure is disclosed. In general, a non-AP STA may transmit a request to trigger to the AP to ask the AP to trigger the non-AP STA for data transmission. For instance, if a packet in the queue of the non-AP STA is sufficiently large that the non-AP STA cannot transmit it using an ER-PPDU with a length less than a threshold (e.g., the maximum size threshold discussed above), then the non-AP STA may transmit a request to trigger 1400 to the AP, as shown in FIG. 14A. In some examples, the request to trigger frame 1400 contains non-AP STA information, such as address (e.g., MAC address or STA-ID), packet information such as first packet (e.g., MPDU) size, queue size, access category information, and/or packet type (e.g., control, management, data frame), among others. The request to trigger frame 1400 can also include AP information, such as address (e.g., MAC address or BSS Color). Once the AP receives the request to trigger frame 1400, the AP can trigger 1402 the non-AP STA to transmit in the subsequent TB-PPDU 1404 and grant a minimum duration for the TB-PPDU 1404 based on the information (e.g., first packet size, queue size) included in the request to trigger frame 1400.

Figure 14B:
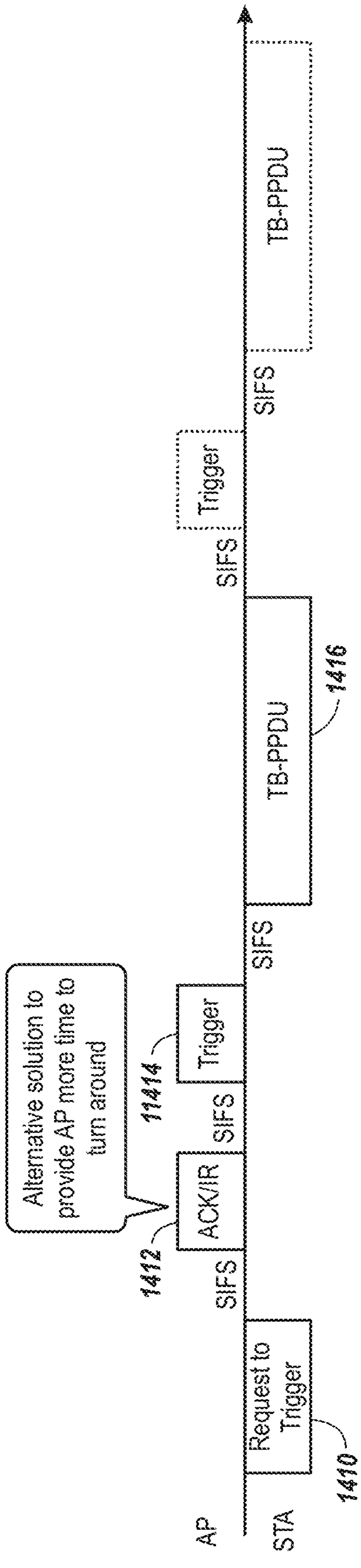

Referring to FIG. 14B, in some examples, after receiving a request to trigger 1410, the AP can first send an acknowledgement 1412 before triggering 1414 the non-AP STA to transmit in the subsequent TB-PPDU 1416. In doing so, the AP is afforded more time to determine (and allocate resource for) a sufficient minimum duration for the TB-PPDU 1416 based on the size information included in the request to trigger frame 1410.

Figure 15A:
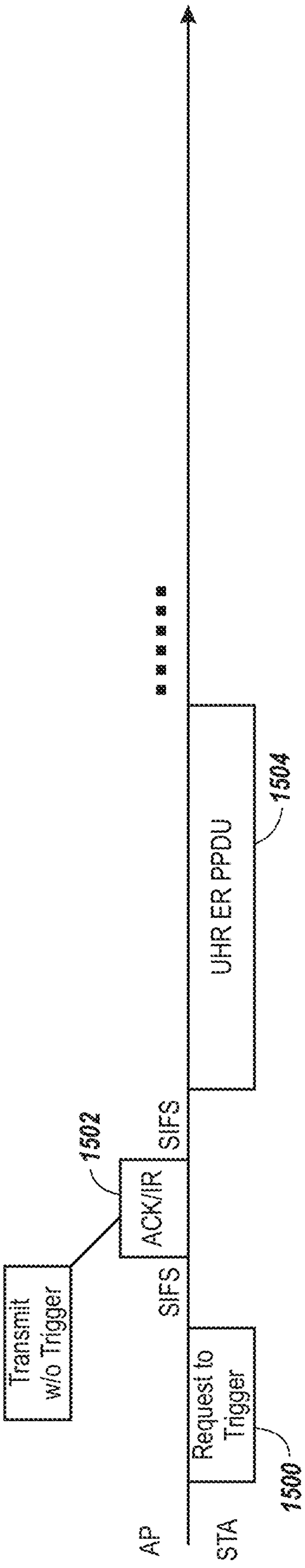
FIGS. 15A and 15B illustrate examples of enabling both enhanced distributed channel access (EDCA) and trigger based uplink transmissions, according to some implementations.
Figure 15B:
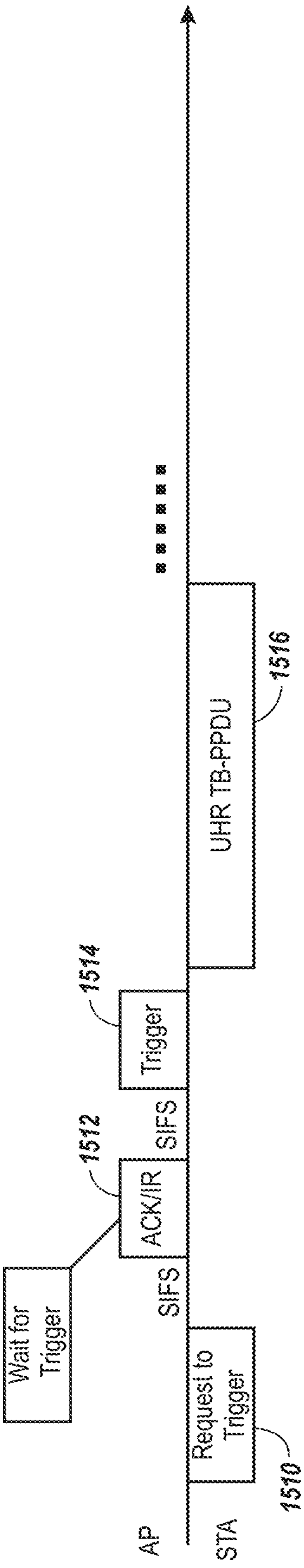

In some examples, both EDCA and trigger-based uplink transmissions can be enabled, in accordance with an aspect of the present disclose. Referring to FIG. 15A, in a first mode (e.g., mode 1) in which the AP is serving a single non-AP STA, the AP receives a request to trigger 1500 from the non-AP STA and, in response, transmits an acknowledgement 1502 with an indication that the non-AP STA should transmit without awaiting a trigger. In some examples, such an indication can be a mode indication (e.g., mode 1). Based on the indication in the acknowledgement 1502, the non-AP STA knows to transmit the UHR ER PPDU 1504 without waiting for a trigger. In such a case, network allocation vector (NAV) protection can be used to indicate the duration of the UHR ER PPDU to other STAs (and to protect against collisions by other STAs that may be listening). Referring to FIG. 15B, in a second mode (e.g., mode 2) in which the AP is serving multiple non-AP STAs with trigger frame(s), the AP receives a request to trigger 1510 from a non-AP STA and, in response, transmits an acknowledgement 1512 with an indication that the non-AP STA should await a trigger message before transmitting. In some examples, such an indication can be a mode indication (e.g., mode 2). Based on the indication in the acknowledgement 1512, the non-AP STA awaits the trigger 1514 from the AP before transmitting in the UHR-TB-PPDU 1516.

According to the IEEE 802.11ax ER SU PPDU rules, a control frame sent by an HE STA as a response to an HE SU PPDU or a non-HT PPDU that does not contain a triggering frame should be carried in a non-HT PPDU, unless the most recent PPDU sent by the HE STA to the recipient of the control frame, after association, was an HE ER SU PPDU. In this case, the control frame should be carried in an HE ER SU PPDU. Similarly, a control frame sent by an HE STA as a response to an HE ER SU PPDU that does not contain a triggering frame should be carried in an HE ER SU PPDU, unless the most recent PPDU sent by the HE STA to the recipient of the control frame, after association, was not an HE ER SU PPDU. In this case, the control frame should be carried in a non-HT PPDU. Further, a control response frame shall not be sent in an HE ER SU PPDU if the channel bandwidth of the PPDU containing the frame that elicited the response is greater than 20 MHz.

In view of the foregoing rules, the format of control response frame to an HE ER SU PPDU is limited to any previous transmission of the HE ER SU PPDU. That is, if the responder STA did not send any HE ER SU PPDU in the uplink prior to sending the control response, it cannot send the control response in HE ER SU PPDU. On the other hand, if the format of previous PPDU sent by the responder was not an HE ER SU PPDU, then the format of control response frame to an HE ER SU PPDU should be a non-HT PPDU.

In accordance with an aspect of the present disclosure, rules for HE ER SU PPDU control response frame are extended to allow a control response with an UHR ER SU PPDU format to be sent in response to non-HT PPDU, HE/EHT/UHR SU PPDU, and/or HE ER SU PPDU. In particular, it is proposed to allow UHR ER SU PPDU in duplicate transmission mode to be sent in response to non-HT PPDU, HE/EHT/UHR SU PPDU, and/or HE ER SU PPDU when the bandwidth is larger than 20 MHz. In this way, a CTS can be sent using a UHR ER PPDU format in response to an RTS sent using a non-HT PPDU format (among other examples). For unassociated STAs, if the STA sends a probe request or an association request using an UHR ER PPDU, the AP should expect the UHR ER PPDU format for the control response, for example, control response frames to probe response and association response.

In some examples, the foregoing capabilities can be encompassed in a mode of operation, which can be enabled (and disabled) through negotiations between the AP and STA. Such a negotiation can be implemented through, for example, use of an operation mode notification (OMN) frame, through the capability field or other capability messaging, and/or through a control response, among others. If this mode is enabled, the STA can transmit the control response using a UHR-ER-SU-PPDU regardless of the received PPDU format or the more recent PPDU sent by the STA to the recipient of the control frame. In this example, the AP expects to receive the UHR-ER-SU-PPDU and sets the TXOP duration accordingly when it initiates the TXOP.

In some examples, a semi-static mode of operation change can be used. For example, an indication in QoS-Null (or another frame) can be used to inform the AP that the UHR-ER-SU-PPDU format is to be used as the control response. In some examples, one bit is used to enable/disable this mode. For instance, a 1 (or 0) can be used to enable the mode (e.g., control response is UHR-ER-SU-PPDU format), and a 0 (or 1) can be used to disable the mode (e.g., control response is non-HT PPDU format).

In some examples, a dynamic mode of operation change can be used. For example, when an AP receives the first response as an UHR ER PPDU, it can assume the rest of response would be in UHR ER PPDU until the STA disables it using the semi-static operation mode change described above. When an AP receives an unsolicited PPDU in the UHR ER format, the AP will assume the rest of response would be in UHR ER format until the STA disables it using, for example, the semi-static operation mode change discussed above.

Figure 16:
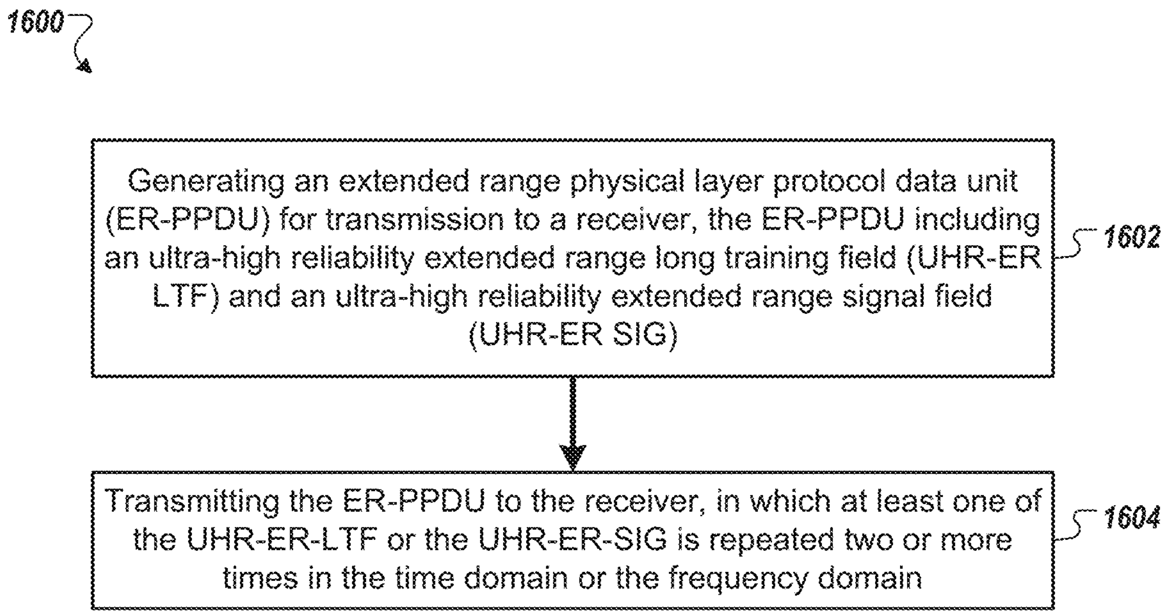
FIG. 16 illustrates a flowchart of an example method, according to some implementations.

FIG. 16 illustrates a flowchart of an example method 1600, according to some implementations. For clarity of presentation, the description that follows generally describes method 1600 in the context of the other figures in this description. For example, method 1600 can be performed by one or more of the electronic devices 110 of FIG. 1. It will be understood that method 1600 can be performed, for example, by any suitable system, environment, software, hardware, or a combination of systems, environments, software, and hardware, as appropriate. In some implementations, various steps of method 1600 can be run in parallel, in combination, in loops, or in any order.

Operations of the method 1600 include generating 1602 an extended range physical layer protocol data unit (ER-PPDU) for transmission to a receiver. The PPDU includes an ultra-high reliability extended range long training field (UHR-ER LTF) and an ultra-high reliability extended range signal field (UHR-ER SIG). After generating the ER-PPDU, the method 1600 includes transmitting 1604 the PPDU to the receiver, in which at least one of the UHR-ER-LTF or the UHR-ER-SIG is repeated two or more times in the time domain or the frequency domain.

The example method 1600 shown in FIG. 16 can be modified or reconfigured to include additional, fewer, or different steps (not shown in FIG. 16), which can be performed in the order shown or in a different order. In some examples, at least one of the UHR-ER-LTF or the UHR-ER-SIG uses a 1× format. In some examples, at least one of the UHR-ER-LTF or the UHR-ER-SIG is modulated over the entire length of the OFDM symbol using every fourth subcarrier of the OFDM symbol. In some examples, the ER-PPDU includes 52-tone resource units and a channel bandwidth of 20 megahertz, and at least one of the UHR-ER-LTF or the UHR-ER-SIG is modulated over the entire length of the OFDM symbol using every fourth subcarrier from subcarrier index −104 to subcarrier index 104 (or from subcarrier index −112 to 112 when using a HE/EHT/U-SIG tone plan). In some examples, at least one of the UHR-ER-LTF or the UHR-ER-SIG is repeated four times in the ER-PPDU in either the time or frequency domain. In some examples, the OFDM symbol length including guard interval is 16 microseconds.

In some examples, the ER-PPDU includes an extended range preamble including a legacy short training field (L-STF), a legacy long training field (L-LTF), and one or more additional fields between the L-LTF and the UHR-ER-LTF, such as one or more of a legacy signal field (L-SIG), a repeated legacy signal field (RL-SIG), or a universal signal field (U-SIG). At least one of the L-STF and the L-LTF can be power boosted by 3 or more decibels (e.g., between 3 dB and 6 dB). In some examples, the PPDU further includes an ultra-high reliability short training field (UHR-STF).

In some examples, the method 1600 includes obtaining data for transmission to the receiver, and the PPDU includes a data field that includes at least a portion of the data for transmission to the receiver. In some examples, the data field is repeated two or more times in the time domain or the frequency domain. In some examples, the data field is modulated over an entire length of an OFDM symbol using every fourth subcarrier of the OFDM symbol, and the data field is repeated four times in the ER-PPDU. In some examples, the method 1600 includes performing center frequency offset (CFO) correction before transmission of the PPDU to the receiver, in which a residual CFO after performing the CFO correction is less than or equal to 15 kilohertz.

Figure 17:
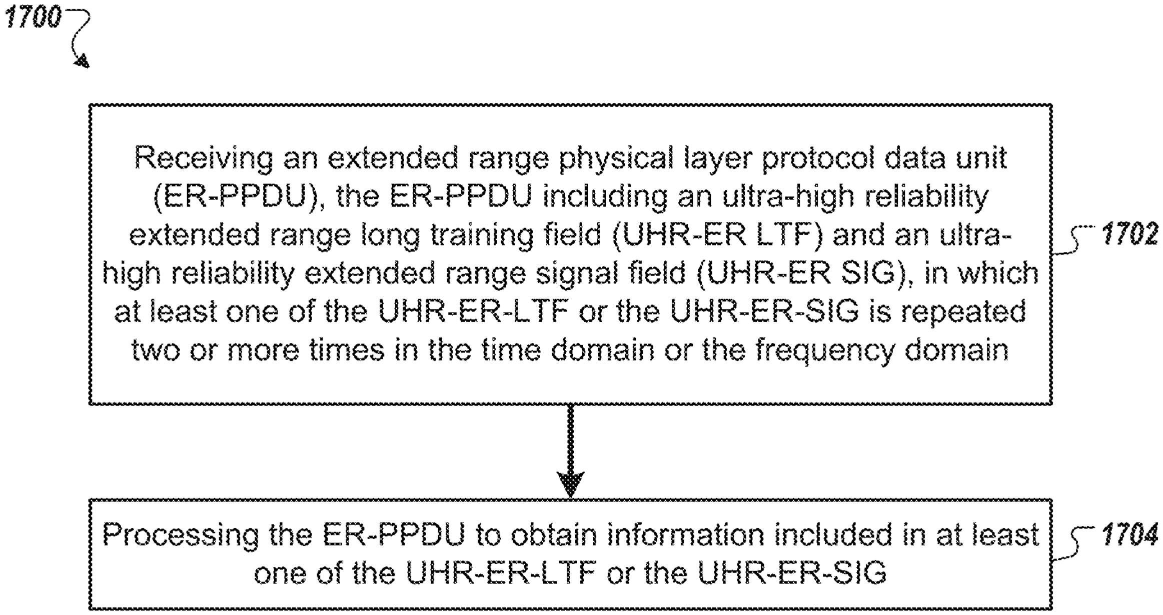
FIG. 17 illustrates a flowchart of an example method, according to some implementations.

FIG. 17 illustrates a flowchart of an example method 1700, according to some implementations. For clarity of presentation, the description that follows generally describes method 1700 in the context of the other figures in this description. For example, method 1700 can be performed by the access point 112 of FIG. 1. It will be understood that method 1700 can be performed, for example, by any suitable system, environment, software, hardware, or a combination of systems, environments, software, and hardware, as appropriate. In some implementations, various steps of method 1700 can be run in parallel, in combination, in loops, or in any order.

Operations of the method 1700 include receiving 1702 an extended range physical layer protocol data unit (ER-PPDU) that includes an ultra-high reliability extended range long training field (UHR-ER LTF) and an ultra-high reliability extended range signal field (UHR-ER SIG), in which at least one of the UHR-ER-LTF or the UHR-ER-SIG is repeated two or more times in the time domain or the frequency domain. Upon receipt of the ER-PPDU, the method 1700 includes processing 1704 the PPDU to obtain information included in at least one of the UHR-ER-LTF or the UHR-ER-SIG.

The example method 1700 shown in FIG. 17 can be modified or reconfigured to include additional, fewer, or different steps (not shown in FIG. 17), which can be performed in the order shown or in a different order. In some examples, at least one of the UHR-ER-LTF or the UHR-ER-SIG uses a 1× format. In some examples, at least one of the UHR-ER-LTF or the UHR-ER-SIG is modulated over the entire length of the OFDM symbol using every fourth subcarrier of the OFDM symbol. In some examples, the ER-PPDU includes 52-tone resource units and a channel bandwidth of 20 megahertz, and at least one of the UHR-ER-LTF or the UHR-ER-SIG is modulated over the entire length of the OFDM symbol using every fourth subcarrier from subcarrier index −104 to subcarrier index 104 (or from subcarrier index −112 to 112 when using a HE/EHT/U-SIG tone plan). In some examples, at least one of the UHR-ER-LTF or the UHR-ER-SIG is repeated four times in the ER-PPDU.

In some examples, the ER-PPDU includes a data field that is modulated over an entire length of an OFDM symbol using every fourth subcarrier of the OFDM symbol and repeated four times in the PPDU, and the method 1700 includes processing the ER-PPDU to obtain data from the transmitter. In some examples, the ER-PPDU includes an extended range preamble that includes a legacy short training field (L-STF), a legacy long training field (L-LTF), and one or more additional fields between the L-LTF and the UHR-ER-LTF, such as one or more of a legacy signal field (L-SIG), a repeated legacy signal field (RL-SIG), or a universal signal field (U-SIG), and the method 1700 includes processing the ER-PPDU to obtain information included in at least one of the L-STS, the L-LTF, the L-SIG, the RL-SIG, or the U-SIG. The L-STF and the L-LTF can be power boosted by 3 or more decibels. In some examples, the ER-PPDU includes an ultra-high reliability short training field (UHR-STF), and the method 1700 includes processing the PPDU to obtain information included in the UHR-STF.

In some examples, the method 1700 includes performing cross correlation to detect a center frequency offset (CFO) for the ER-PPDU. In some examples, the CFO for the ER-PPDU is corrected before transmission such that a residual CFO for the ER-PPDU is less than or equal to 15 kilohertz.

Figure 18:
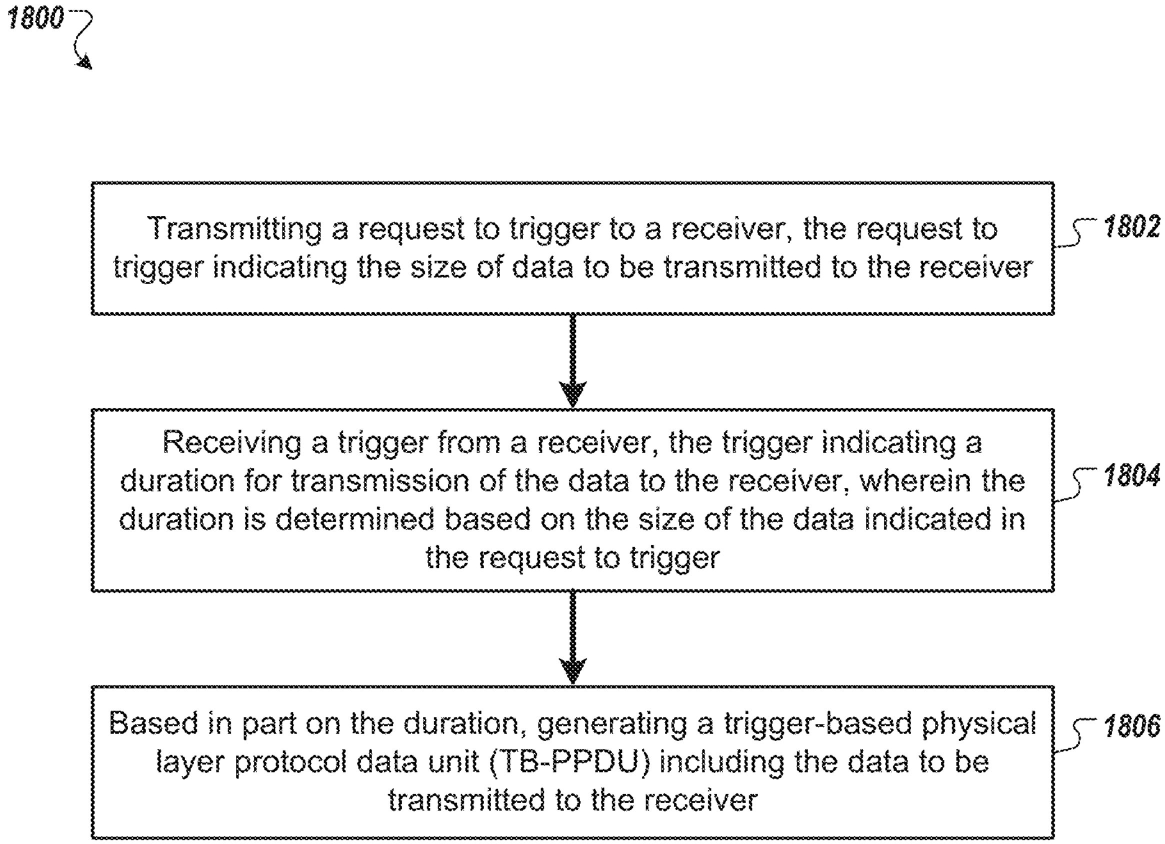
FIG. 18 illustrates a flowchart of an example method, according to some implementations.

FIG. 18 illustrates a flowchart of an example method 1800, according to some implementations. For clarity of presentation, the description that follows generally describes method 1800 in the context of the other figures in this description. For example, method 1800 can be performed by one or more of the electronic devices 110 of FIG. 1. It will be understood that method 1800 can be performed, for example, by any suitable system, environment, software, hardware, or a combination of systems, environments, software, and hardware, as appropriate. In some implementations, various steps of method 1800 can be run in parallel, in combination, in loops, or in any order.

Operations of the method 1800 include transmitting 1802 a request to trigger to a receiver. The request to trigger indicates a size of data (e.g., a first packet size) to be transmitted to the receiver. In some examples, the request to trigger indicates other information, such as address information (e.g., MAC address, STA-ID BSS Color) for the transmitter and/or receiver, queue size, access category information, and/or packet type (e.g., control, management, data frame), among others. In some examples, the request to trigger is transmitted in response to the size of the data satisfying a threshold value (e.g., a maximum size value, which can be indicated by the receiver).

A trigger is received 1804 from the receiver in response to the request to trigger. The trigger indicates a duration for transmission of the data to the receiver, the duration being determined based on the size of the data indicated in the request to trigger. In some examples, an acknowledgement of the request to trigger is received from the receiver before receipt of the trigger.

Based in part on the duration, a trigger-based physical layer protocol data unit (TB-PPDU) is generated 1806. The TB-PPDU includes the data to be transmitted to the receiver. In some examples, the TB-PPDU is an ultra-high reliability TB-PPDU. After generating the TB-PPDU, the TB-PPDU can be transmitted to the receiver.

Figure 19:
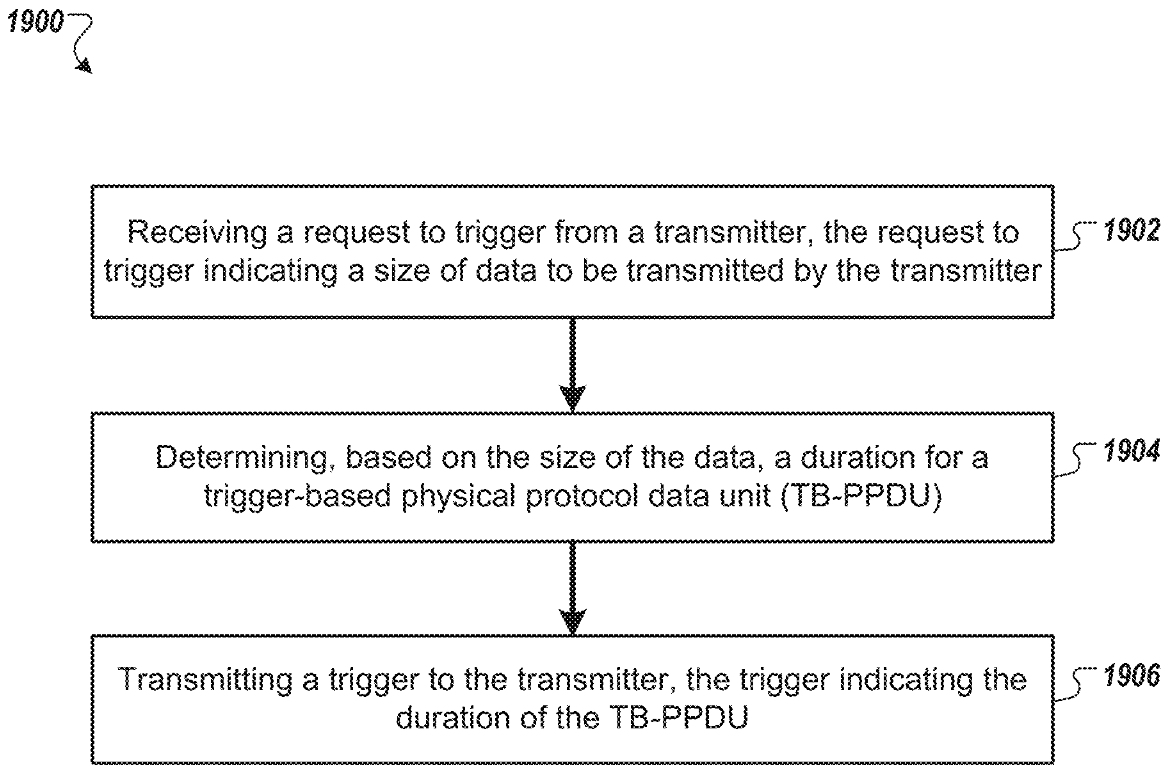
FIG. 19 illustrates a flowchart of an example method, according to some implementations.

FIG. 19 illustrates a flowchart of an example method 1900, according to some implementations. For clarity of presentation, the description that follows generally describes method 1900 in the context of the other figures in this description. For example, method 1900 can be performed by one or more of the access point 112 of FIG. 1. It will be understood that method 1900 can be performed, for example, by any suitable system, environment, software, hardware, or a combination of systems, environments, software, and hardware, as appropriate. In some implementations, various steps of method 1900 can be run in parallel, in combination, in loops, or in any order.

Operations of the method 1900 include receiving 1902 a request to trigger from a transmitter. The request to trigger indicates a size of data (e.g., a first packet size) to be transmitted by the transmitter. In some examples, the request to trigger indicates other information, such as address information (e.g., MAC address, STA-ID BSS Color) for the transmitter and/or receiver, queue size, access category information, and/or packet type (e.g., control, management, data frame), among others. In some examples, the request to trigger is received in response to the transmitter determining that the size of the data satisfies a threshold value (e.g., a maximum size value, which can be indicated by the receiver).

Based on the size of the data, a duration for a TB-PPDU is determined 1904. Then, a trigger is transmitted 1906 to the transmitter. The trigger indicates the duration for transmission of the Tb-PPDU. In some examples, an acknowledgement of the request to trigger is transmitted to the transmitter before transmission of the trigger. In some examples, the TB-PPDU is received from the transmitter, the TB-PPDU having been generated based in part on the duration. In some examples, the TB-PPDU is an ultra-high reliability TB-PPDU.

Figure 20:
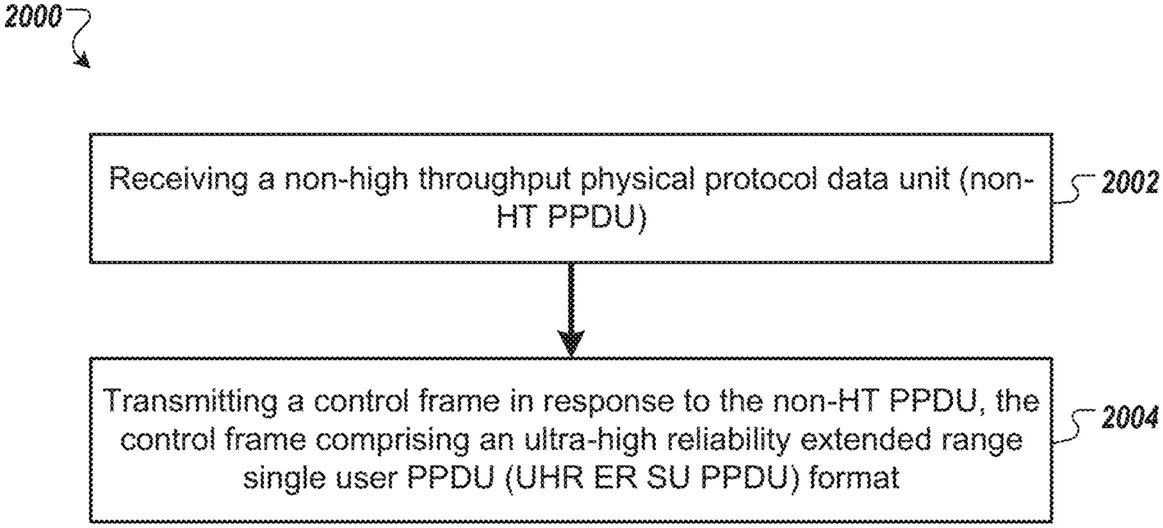
FIG. 20 illustrates a flowchart of an example method, according to some implementations.

FIG. 20 illustrates a flowchart of an example method 2000, according to some implementations. For clarity of presentation, the description that follows generally describes method 2000 in the context of the other figures in this description. For example, method 2000 can be performed by one or more of the electronic devices 110 of FIG. 1. It will be understood that method 2000 can be performed, for example, by any suitable system, environment, software, hardware, or a combination of systems, environments, software, and hardware, as appropriate. In some implementations, various steps of method 2000 can be run in parallel, in combination, in loops, or in any order.

Operations of the method 2000 include receiving 2002 a non-high throughput physical protocol data unit (non-HT PPDU). In response to the non-HT PPDU, a control frame is transmitted 2004 using an ultra-high reliability extended range single user PPDU (UHR ER SU PPDU) format. In some examples, the non-HT PPDU is a request to send (RTS), and the control frame using the UHR ER SU PPDU format is a clear to send (CTS). In some examples, the control frame using the UHR ER SU PPDU format is transmitted in duplicate transmission mode over a bandwidth greater than or equal to 20 megahertz.

In some examples, the control frame is transmitted using the UHR ER SU PPDU format according to a mode of operation. In some examples, the mode of operation is negotiated based on an operation mode notification, a capability field, or a control response. In some examples, the mode of operation is set according to an indication in a quality of service null (QoS-Null) frame (or another frame). The mode of operation can remain unchanged until a counterindication in the QoS-Null frame.

Figure 21:
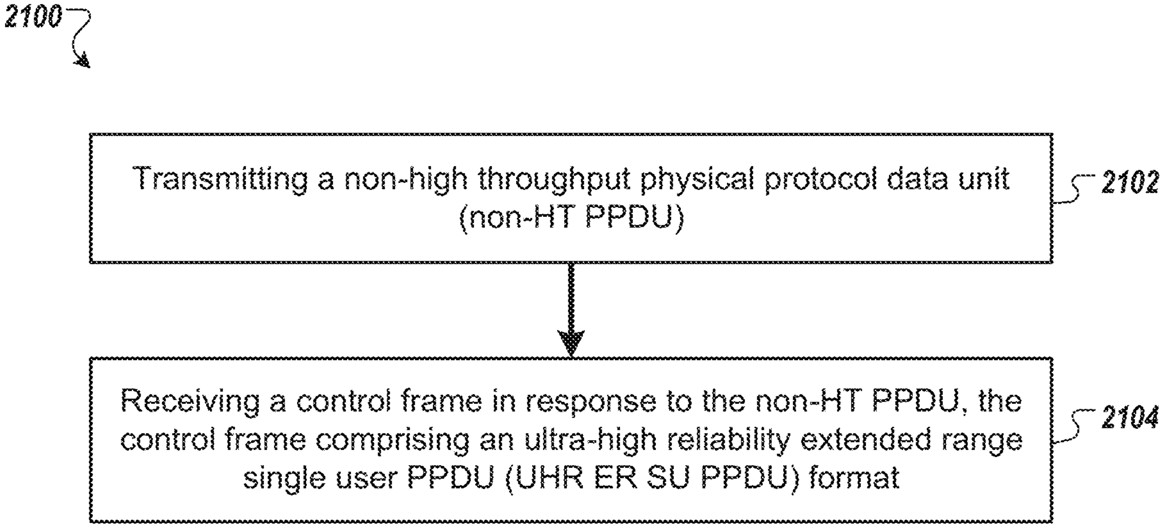
FIG. 21 illustrates a flowchart of an example method, according to some implementations.

FIG. 21 illustrates a flowchart of an example method 2100, according to some implementations. For clarity of presentation, the description that follows generally describes method 2100 in the context of the other figures in this description. For example, method 2100 can be performed by one or more of the access point 112 of FIG. 1. It will be understood that method 2100 can be performed, for example, by any suitable system, environment, software, hardware, or a combination of systems, environments, software, and hardware, as appropriate. In some implementations, various steps of method 2100 can be run in parallel, in combination, in loops, or in any order.

Operations of the method 2100 include transmitting 2102 a non-high throughput physical protocol data unit (non-HT PPDU). In response to the non-HT PPDU, a control frame that uses an UHR ER SU PPDU format is received 2104. In some examples, the non-HT PPDU is an RTS, and the control frame using the UHR ER SU PPDU format is a CTS. In some examples, the control frame using the UHR ER SU PPDU format is received in duplicate transmission mode over a bandwidth greater than or equal to 20 megahertz.

In some examples, the control frame is received using the UHR ER SU PPDU format according to a mode of operation. In some examples, the mode of operation is negotiated based on an operation mode notification, a capability field, or a control response. In some examples, the mode of operation is set according to an indication in a quality of service null (QoS-Null) frame (or another frame). The mode of operation can remain unchanged until a counterindication in the QoS-Null frame.

Figure 22:
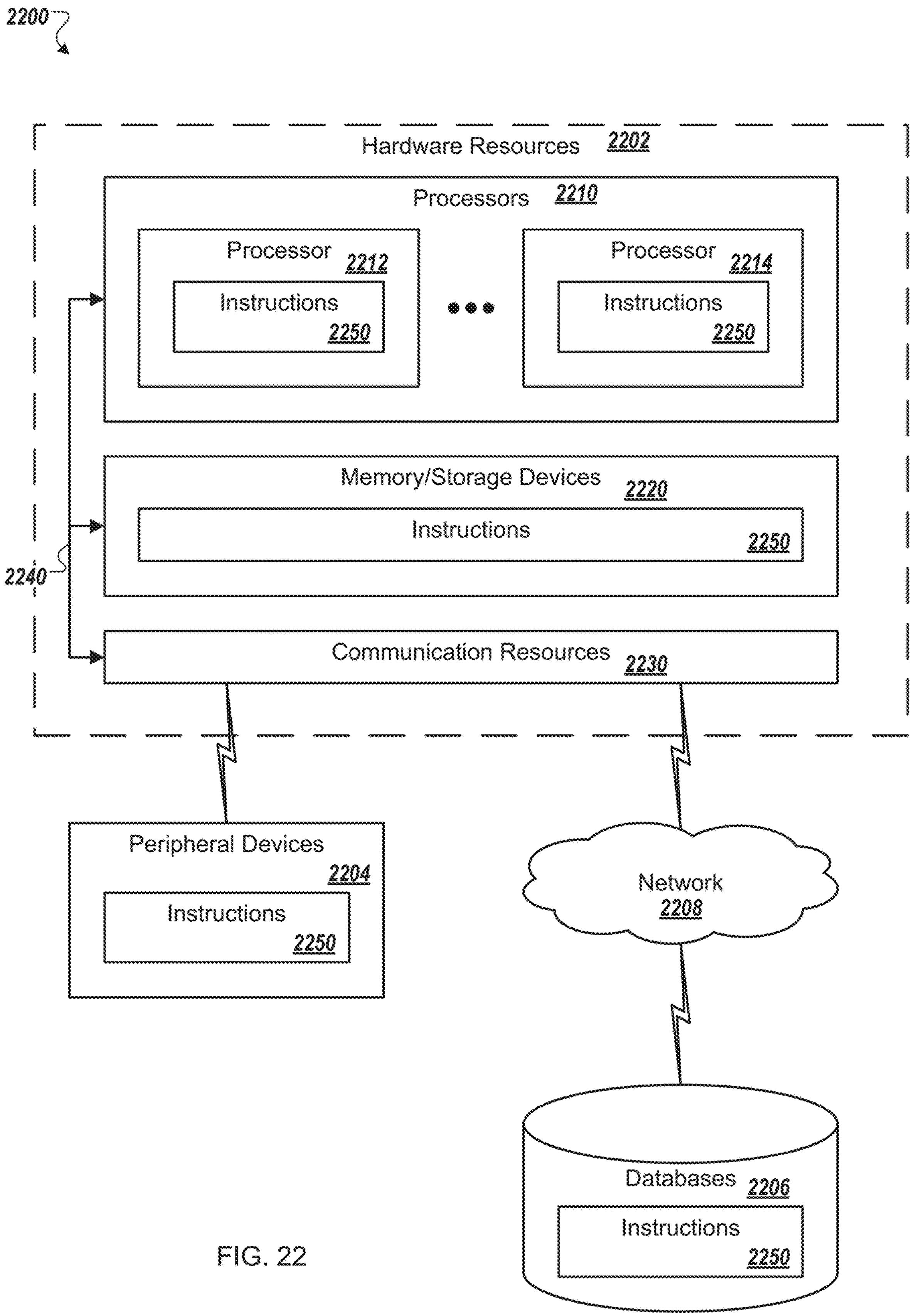
FIG. 22 illustrates a block diagram of an example electronic device, according to some implementations.

FIG. 22 illustrates a block diagram of an electronic device 2200, according to some implementations. The electronic device 2200 can be a cellular telephone, a smartwatch, an access point, a wireless speaker, an Internet-of-Things (IoT) device, among other examples. The electronic device 2200 includes hardware resources 2202 that include one or more processors (or processor cores) 2210, one or more memory/storage devices 2220, and one or more communication resources 2230, each of which can be communicatively coupled via a bus 2240.

The one or more processors 2210 include one or more devices configured to perform computational operations. For example, the one or more processors 2210 can include one or more microprocessors, application-specific integrated circuits (ASICs), microcontrollers, graphics processing units (GPUs), programmable-logic devices, and/or one or more digital signal processors (DSPs). The processors 2210 can include, for example, a processor 2212 and a processor 2214. The processor(s) 2210 can be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 2220 can include main memory, disk storage, or any suitable combination thereof. The memory/storage devices 2220 can include, but are not limited to, any type of volatile or nonvolatile memory such as dynamic random-access memory (DRAM), static random-access memory (SRAM), erasable programmable read-only memory (EPROM), electrically erasable programmable read-only memory (EEPROM), Flash memory, solid-state storage, etc. In some implementations, the memory/storage devices 2220 are coupled to one or more high-capacity mass-storage devices (not shown). In some examples, memory/storage devices 2220 can be coupled to a magnetic or optical drive, a solid-state drive, or another type of mass-storage device. In these examples, the memory/storage devices 2220 can be used by electronic device 2200 as fast-access storage for often-used data, while the mass-storage device is used to store less frequently used data.

The communication resources 2230 can include interconnection or network interface components or other suitable devices to communicate with one or more peripheral devices 2204 or one or more databases 2206 via a network 2208. For example, the communication resources 2230 can include wired communication components (e.g., for coupling via USB), cellular communication components, NFC components, Bluetooth® (or Bluetooth® Low Energy) components, Wi-Fi® components, and other communication components.

The communication resources 2230 include one or more devices configured to couple to and communicate on a wired and/or wireless network (i.e., to perform network operations), such as: control logic, one or more interface circuits and a set of antennas (or antenna elements) in an adaptive array that can be selectively turned on and/or off by control logic to create a variety of optional antenna patterns or "beam patterns." Alternatively, instead of the set of antennas, in some examples, electronic device 2200 includes one or more nodes, e.g., a pad or a connector, which can be coupled to the set of antennas. Thus, electronic device 2200 might or might not include the set of antennas. For example, communication resources 2230 can include a Bluetooth™ networking system, a cellular networking system (e.g., a 3G/4G/5G/6G network such as UMTS, LTE, etc.), a universal serial bus (USB) networking system, a networking system based on the standards described in IEEE 802.11 (e.g., a Wi-Fi® networking system), an Ethernet networking system, and/or another networking system.

In some implementations, communication resources 2230 includes one or more radios, such as a wake-up radio that is used to receive wake-up frames and wake-up beacons, and a main radio that is used to transmit and/or receive frames or packets during a normal operation mode. The wake-up radio and the main radio can be implemented separately (such as using discrete components or separate integrated circuits) or in a common integrated circuit.

The communication resources 2230 include processors, controllers, radios/antennas, sockets/plugs, and/or other devices used for coupling to, communicating on, and handling data and events for each supported networking system. Note that mechanisms used for coupling to, communicating on, and handling data and events on the network for a network system are sometimes collectively referred to as a "network interface" for the network system.

Instructions 2250 can include software, a program, an application, an applet, an app, or other executable code for causing at least any of the processors 2210 to perform any one or more of the methodologies discussed herein. The instructions 2250 can reside, completely or partially, within at least one of the processors 2210 (e.g., within the processor's cache memory), the memory/storage devices 2220, or any suitable combination thereof. In some implementations, any portion of the instructions 2250 can be transferred to the hardware resources 2202 from any combination of the peripheral devices 2204 or the databases 2206. Accordingly, the memory of processors 2210, the memory/storage devices 2220, the peripheral devices 2204, and the databases 2206 are examples of computer-readable and machine-readable media.

While the preceding discussion used a Wi-Fi communication protocol as an illustrative example, in other implementations a wide variety of communication protocols and, more generally, wireless communication techniques can be used. Thus, the communication techniques can be used in a variety of network interfaces. Furthermore, while some of the operations in the preceding implementations were implemented in hardware or software, in general the operations in the preceding implementations can be implemented in a wide variety of configurations and architectures. Therefore, some or all of the operations in the preceding implementations can be performed in hardware, in software or a combination of both. For example, at least some of the operations in the communication techniques can be implemented using instructions 2250, operating system (such as a driver for an interface circuit in communication resources 2230) or in firmware in an interface circuit in communication resources 2230. Additionally or alternatively, at least some of the operations in the communication techniques can be implemented in a physical layer, such as hardware in an interface circuit in communication resources 2230. In some implementations, the communication techniques are implemented, at least in part, in a MAC layer and/or in a physical layer in an interface circuit in communication resources 2230.

While the preceding implementations illustrated the use of wireless signals in one or more bands of frequencies, in some implementations, electromagnetic signals in one or more different frequency bands are used to determine the range. For example, these signals can be communicated in one or more bands of frequencies, including: a microwave frequency band, a radar frequency band, 900 MHz, 2.4 GHz, 5 GHz, 6 GHz, 60 GHz, and/or a band of frequencies used by a Citizens Broadband Radio Service, by LTE, 5G, or any other communication system.

Although specific components are used to describe electronic device 2200, in some implementations, different components and/or subsystems can be present in electronic device 2200. For example, electronic device 2200 can include one or more additional processing subsystems, memory subsystems, networking subsystems, and/or display subsystems. Additionally, one or more of the subsystems might not be present in electronic device 2200. In some implementations, electronic device 2200 can include one or more additional subsystems that are not shown in FIG. 22. In some implementations, electronic device can include an analysis subsystem that performs at least some of the operations in the communication techniques. Although separate subsystems are shown in FIG. 22, in some implementations some or all of a given subsystem or component can be integrated into one or more of the other subsystems or component(s) in electronic device 2200.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

We claim:

1. A method, comprising:

generating an extended range physical layer protocol data unit (ER-PPDU) for transmission to a receiver, the ER-PPDU comprising an ultra-high reliability extended range long training field (UHR-ER-LTF) and an ultra-high reliability extended range signal field (UHR-ER-SIG); and transmitting the ER-PPDU to the receiver, wherein at least one of the UHR-ER-LTF or the UHR-ER-SIG is repeated two or more times in the time domain or the frequency domain.

2. The method of claim 1, wherein the ER-PPDU further comprises a legacy short training field (L-STF), a legacy long training field (L-LTF), and one or more additional fields between the L-LTF and the UHR-ER-LTF, the one or more additional fields comprising at least one of a legacy signal field (L-SIG), a repeated legacy signal field (RL-SIG), a universal signal field (U-SIG), or an ultra-high reliability short training field (UHR-STF).

3. The method of claim 2, wherein at least one of the L-STF or the L-LTF are power boosted by 3 or more decibels.

4. The method of claim 1, wherein the at least one of the UHR-ER-LTF or the UHR-ER-SIG is modulated over an entire length of an orthogonal frequency division multiplexing (OFDM) symbol.

5. The method of claim 4, wherein the at least one of the UHR-ER-LTF or the UHR-ER-SIG is modulated over the entire length of the OFDM symbol using every fourth subcarrier of the OFDM symbol.

6. The method of claim 4, wherein the OFDM symbol length including a guard interval comprises 16 microseconds.

7. The method of claim 1, wherein the at least one of the UHR-ER-LTF or the UHR-ER-SIG is repeated four times in the time domain or the frequency domain.

8. The method of claim 1, further comprising:

obtaining data for transmission to the receiver, wherein the ER-PPDU further comprises a data field comprising at least a portion of the data for transmission to the receiver.

9. The method of claim 8, wherein the data field is repeated two or more times in the time domain or the frequency domain.

10. The method of claim 8, wherein the data field is modulated over an entire length of an OFDM symbol using every fourth subcarrier of the OFDM symbol.

11. The method of claim 1, further comprising:

performing center frequency offset (CFO) correction before transmission of the ER-PPDU, wherein a residual CFO after performing the CFO correction is less than or equal to 15 kilohertz.

12. The method of claim 1, wherein the method is performed by a non-access point station (non-AP STA).

13. The method of claim 1, further comprising:

receiving an indication from the receiver of a maximum size for the ER-PPDU; and generating the ER-PPDU in accordance with the maximum size.

14. A device, comprising:

one or more processors; and one or more storage devices storing instructions executable by the one or more processors to cause the one or more processors to perform operations comprising:

generating an extended range physical layer protocol data unit (ER-PPDU) for transmission to a receiver, the ER-PPDU comprising an ultra-high reliability extended range long training field (UHR-ER-LTF) and an ultra-high reliability extended range signal field (UHR-ER-SIG); and transmitting the ER-PPDU to the receiver, wherein at least one of the UHR-ER-LTF or the UHR-ER-SIG is repeated two or more times in the time domain or frequency domain.

15. A method, comprising:

receiving an extended range physical layer protocol data unit (ER-PPDU), the ER-PPDU comprising an ultra-high reliability extended range long training field (UHR-ER-LTF) and an ultra-high reliability extended range signal field (UHR-ER-SIG), wherein at least one of the UHR-ER-LTF or the UHR-ER-SIG is repeated two or more times in the time domain or frequency domain; and processing the ER-PPDU to obtain information included in at least one of the UHR-ER-LTF or the UHR-ER-SIG.

16. The method of claim 15, wherein the ER-PPDU further comprises a legacy short training field (L-STF), a legacy long training field (L-LTF), and one or more additional fields between the L-LTF and the UHR-ER-LTF, the one or more additional fields comprising at least one of a legacy signal field (L-SIG), a repeated legacy signal field (RL-SIG), a universal signal field (U-SIG), or an ultra-high reliability short training field (UHR-STF), the method further comprising:

processing the PPDU to obtain information included in at least one of the L-STF, the L-LTF, or the one or more additional fields.

17. The method of claim 16, wherein at least one of the L-STF and the L-LTF are power boosted by 3 or more decibels.

18. The method of claim 15, wherein the at least one of the UHR-ER-LTF or the UHR-ER-SIG is modulated over an entire length of an orthogonal frequency division multiplexing (OFDM) symbol using every fourth subcarrier of the OFDM symbol.

19. The method of claim 15, wherein the at least one of the UHR-ER-LTF or the UHR-ER-SIG is repeated four times in the time domain or the frequency domain.

20. The method of claim 15, wherein the ER-PPDU further comprises a data field that is repeated two or more times in the time domain or the frequency domain, the method further comprising:

processing the ER-PPDU to obtain information included in the data field.

* * * * *